(12) United States Patent
Liberty et al.

(10) Patent No.: US 7,823,062 B2
(45) Date of Patent: Oct. 26, 2010

(54) INTERACTIVE ELECTRONIC TECHNICAL MANUAL SYSTEM WITH DATABASE INSERTION AND RETRIEVAL

(75) Inventors: Matthew R. Liberty, Apalachin, NY (US); Bruce R. Wilde, Vestal, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1009 days.

(21) Appl. No.: 11/562,336

(22) Filed: Nov. 21, 2006

(65) Prior Publication Data

US 2008/0120282 A1    May 22, 2008

(51) Int. Cl.
G06F 17/00    (2006.01)
(52) U.S. Cl. ..................................... 715/234
(58) Field of Classification Search ............... 715/234
See application file for complete search history.

(56) References Cited

U.S. PATENT DOCUMENTS

| | | | |
|---|---|---|---|
| 4,371,952 A | 2/1983 | Schuck |
| 4,412,281 A | 10/1983 | Works |
| 4,570,261 A | 2/1986 | Maher |
| 4,634,110 A | 1/1987 | Julich et al. |
| 5,157,667 A | 10/1992 | Carusone, Jr. et al. |
| 5,223,788 A | 6/1993 | Andreano et al. |
| 5,293,323 A | 3/1994 | Doskocil et al. |
| 5,408,218 A | 4/1995 | Svedberg et al. |
| 5,455,921 A | 10/1995 | DeFilipps et al. |
| 5,479,610 A | 12/1995 | Roll-Mecak et al. |
| 5,600,791 A | 2/1997 | Carlson et al. |
| 5,649,094 A | 7/1997 | Hayashi et al. |
| 5,712,972 A | 1/1998 | Kakkar |
| 5,748,883 A | 5/1998 | Carlson et al. |
| 5,805,793 A | 9/1998 | Green |
| 5,931,877 A | 8/1999 | Smith et al. |
| 5,937,366 A | 8/1999 | Zbytniewski et al. |
| 5,978,841 A | 11/1999 | Berger |
| 6,003,808 A | 12/1999 | Nguyen et al. |

(Continued)

FOREIGN PATENT DOCUMENTS

EP    1331792    7/2003

(Continued)

OTHER PUBLICATIONS

Xu, et al., "XML-Based Data Rendering Engine for Content Management System", Lecture Notes in Computer Science, vol. 2419, Springer Berlin, published Jan. 2002, p. 123-140.*

(Continued)

*Primary Examiner*—Amelia Rutledge
(74) *Attorney, Agent, or Firm*—Miles & Stockbridge PC; James T. Carmichael

(57) ABSTRACT

A Class V Interactive Electronic Technical Manual (IETM) system that allows remote diagnostic engineers to interact directly with on-site maintenance technicians and a system under test. In addition, the IETM system permits automatic synchronization of files on a maintenance technician's portable electronic display device. The IETM system is also capable of dynamically displaying asset specific information and dynamically displaying technical information in multiple languages. The IETM system also includes a database processing system and method for inserting into a database and retrieving from database documents formatted in accordance with a markup language.

21 Claims, 25 Drawing Sheets

U.S. PATENT DOCUMENTS

| | | | |
|---|---|---|---|
| 6,038,233 | A | 3/2000 | Hammamoto et al. |
| 6,118,784 | A | 9/2000 | Tsuchiya et al. |
| 6,122,575 | A | 9/2000 | Schmidt et al. |
| 6,125,312 | A | 9/2000 | Nguyen et al. |
| 6,219,626 | B1 | 4/2001 | Steinmetz et al. |
| 6,226,675 | B1 | 5/2001 | Meltzer et al. |
| 6,240,407 | B1 | 5/2001 | Chang et al. |
| 6,240,526 | B1 | 5/2001 | Petivan et al. |
| 6,317,659 | B1 | 11/2001 | Lindsley et al. |
| 6,341,358 | B1 | 1/2002 | Bagg et al. |
| 6,421,656 | B1 | 7/2002 | Cheng et al. |
| 6,463,440 | B1 | 10/2002 | Hind et al. |
| 6,476,828 | B1 | 11/2002 | Burkett et al. |
| 6,480,974 | B1 | 11/2002 | Porterfield |
| 6,487,479 | B1 | 11/2002 | Nelson |
| 6,510,434 | B1 | 1/2003 | Anderson et al. |
| 6,529,620 | B2 | 3/2003 | Thompson |
| 6,539,337 | B1 | 3/2003 | Provan et al. |
| 6,556,986 | B2 | 4/2003 | Hara et al. |
| 6,567,079 | B1 | 5/2003 | Smailagic et al. |
| 6,567,405 | B1 | 5/2003 | Borella et al. |
| 6,572,376 | B1 | 6/2003 | Saunders |
| 6,574,537 | B2 | 6/2003 | Kipersztok et al. |
| 6,580,717 | B1 | 6/2003 | Higuchi et al. |
| 6,625,618 | B1 | 9/2003 | Arai |
| 6,654,905 | B1 | 11/2003 | Dickens |
| 6,662,089 | B2 | 12/2003 | Felke et al. |
| 6,665,811 | B1 | 12/2003 | De Azevedo et al. |
| 6,675,324 | B2 | 1/2004 | Marisetty et al. |
| 6,697,718 | B2 | 2/2004 | Le Draoullec et al. |
| 6,701,457 | B2 | 3/2004 | Reynolds et al. |
| 6,721,727 | B2 | 4/2004 | Chau et al. |
| 6,725,137 | B2 | 4/2004 | Eagleton et al. |
| 6,732,109 | B2 | 5/2004 | Lindberg et al. |
| 6,738,929 | B2 | 5/2004 | Swoboda et al. |
| 6,772,369 | B2 | 8/2004 | Smith et al. |
| 6,782,380 | B1 | 8/2004 | Thede |
| 6,804,677 | B2 | 10/2004 | Shadmon et al. |
| 6,959,235 | B1 | 10/2005 | Abdel-Malek et al. |
| 6,961,897 | B1 | 11/2005 | Peel et al. |
| 6,973,596 | B2 | 12/2005 | Halphide et al. |
| 7,174,286 | B2 | 2/2007 | Martin et al. |
| 7,428,695 | B2 * | 9/2008 | Chiang et al. ............... 715/201 |
| 2001/0040895 | A1 | 11/2001 | Templin |
| 2001/0053156 | A1 | 12/2001 | Higuchi et al. |
| 2002/0004804 | A1 | 1/2002 | Muenzel |
| 2002/0065822 | A1 | 5/2002 | Itani |
| 2002/0085020 | A1 | 7/2002 | Carroll, Jr. |
| 2002/0087236 | A1 | 7/2002 | Moccio |
| 2002/0116371 | A1 | 8/2002 | Dodds et al. |
| 2002/0143803 | A1 | 10/2002 | Chen et al. |
| 2002/0147726 | A1 | 10/2002 | Yehia et al. |
| 2002/0147748 | A1 | 10/2002 | Huang et al. |
| 2002/0150112 | A1 | 10/2002 | Tsuchiya et al. |
| 2002/0154624 | A1 | 10/2002 | Oishi et al. |
| 2002/0159461 | A1 | 10/2002 | Hamamoto et al. |
| 2002/0165872 | A1 | 11/2002 | Meltzer et al. |
| 2002/0174387 | A1 | 11/2002 | Lohoff et al. |
| 2002/0181465 | A1 | 12/2002 | Tsuchiya et al. |
| 2002/0181500 | A1 | 12/2002 | Higuchi et al. |
| 2002/0184111 | A1 | 12/2002 | Swanson |
| 2002/0196281 | A1 | 12/2002 | Audleman et al. |
| 2002/0198639 | A1 | 12/2002 | Ellis et al. |
| 2003/0004998 | A1 | 1/2003 | Datta |
| 2003/0009710 | A1 | 1/2003 | Grant |
| 2003/0018661 | A1 | 1/2003 | Darugar |
| 2003/0025732 | A1 | 2/2003 | Prichard |
| 2003/0028858 | A1 | 2/2003 | Hines |
| 2003/0037238 | A1 | 2/2003 | Warner et al. |
| 2003/0048804 | A1 | 3/2003 | Inouchi et al. |
| 2003/0055945 | A1 | 3/2003 | Bear et al. |
| 2003/0074636 | A1 | 4/2003 | Manepalli |
| 2003/0083794 | A1 | 5/2003 | Halm et al. |
| 2003/0109973 | A1 | 6/2003 | Hensey et al. |
| 2003/0110192 | A1 | 6/2003 | Valente et al. |
| 2003/0110292 | A1 | 6/2003 | Takeda et al. |
| 2003/0120686 | A1 | 6/2003 | Kim et al. |
| 2003/0126129 | A1 | 7/2003 | Watson |
| 2003/0126136 | A1 | 7/2003 | Omoigui |
| 2003/0135825 | A1 | 7/2003 | Gertner et al. |
| 2003/0146937 | A1 | 8/2003 | Lee |
| 2003/0149790 | A1 | 8/2003 | Hwang |
| 2003/0149934 | A1 | 8/2003 | Worden |
| 2003/0184585 | A1 | 10/2003 | Lin et al. |
| 2003/0185236 | A1 | 10/2003 | Asano et al. |
| 2003/0187751 | A1 | 10/2003 | Watson et al. |
| 2003/0187882 | A1 | 10/2003 | Jinmei et al. |
| 2003/0191564 | A1 | 10/2003 | Haugse et al. |
| 2003/0193965 | A1 | 10/2003 | Higuchi et al. |
| 2003/0200533 | A1 | 10/2003 | Roberts et al. |
| 2003/0204332 | A1 | 10/2003 | Beney et al. |
| 2003/0204481 | A1 | 10/2003 | Lau |
| 2003/0204511 | A1 | 10/2003 | Brundage et al. |
| 2003/0212664 | A1 | 11/2003 | Breining et al. |
| 2003/0215128 | A1 | 11/2003 | Thompson |
| 2003/0237046 | A1 | 12/2003 | Parker et al. |
| 2004/0020994 | A1 | 2/2004 | Muehl et al. |
| 2004/0024501 | A1 | 2/2004 | Muehl et al. |
| 2004/0034456 | A1 | 2/2004 | Felke et al. |
| 2004/0039499 | A1 | 2/2004 | Felke et al. |
| 2004/0060007 | A1 | 3/2004 | Gottlob et al. |
| 2004/0078123 | A1 | 4/2004 | Igloi et al. |
| 2004/0098311 | A1 | 5/2004 | Nair et al. |
| 2004/0128617 | A1 | 7/2004 | Oh |
| 2004/0143599 | A1 | 7/2004 | Shalabi et al. |
| 2004/0153448 | A1 | 8/2004 | Cheng et al. |
| 2004/0172597 | A1 | 9/2004 | Canali et al. |
| 2004/0177321 | A1 | 9/2004 | Brown et al. |
| 2004/0183831 | A1 | 9/2004 | Ritchy et al. |
| 2004/0193962 | A1 | 9/2004 | Johnson et al. |
| 2004/0205082 | A1 | 10/2004 | Fontoura et al. |
| 2004/0205497 | A1 * | 10/2004 | Alexander et al. ........ 715/501.1 |
| 2004/0205571 | A1 | 10/2004 | Adler et al. |
| 2004/0205609 | A1 | 10/2004 | Milton et al. |
| 2004/0216003 | A1 | 10/2004 | Floyd et al. |
| 2004/0221260 | A1 | 11/2004 | Martin et al. |
| 2004/0267813 | A1 | 12/2004 | Rivers-Moore et al. |
| 2004/0268306 | A1 | 12/2004 | Cheng et al. |
| 2005/0004892 | A1 | 1/2005 | Brundage et al. |
| 2005/0021548 | A1 | 1/2005 | Bohannon et al. |
| 2005/0027480 | A1 | 2/2005 | Qiao et al. |
| 2005/0055336 | A1 | 3/2005 | Hui et al. |
| 2005/0060317 | A1 | 3/2005 | Lott et al. |
| 2005/0132282 | A1 | 6/2005 | Panditharadhya et al. |
| 2005/0138544 | A1 | 6/2005 | Beck et al. |
| 2005/0165724 | A1 | 7/2005 | West |
| 2005/0182650 | A1 | 8/2005 | Maddox et al. |
| 2005/0183007 | A1 | 8/2005 | Berbaum et al. |
| 2005/0193275 | A1 | 9/2005 | Gohel |
| 2005/0223288 | A1 | 10/2005 | Berbaum et al. |
| 2005/0223290 | A1 | 10/2005 | Berbaum et al. |
| 2005/0240289 | A1 | 10/2005 | Hoyte et al. |
| 2005/0240555 | A1 | 10/2005 | Wilde et al. |
| 2005/0283694 | A1 | 12/2005 | Shabib et al. |
| 2006/0085465 | A1 | 4/2006 | Nori et al. |
| 2006/0085692 | A1 | 4/2006 | Berbaum et al. |
| 2006/0120181 | A1 * | 6/2006 | Berbaum et al. ............ 365/191 |
| 2006/0218512 | A1 | 9/2006 | Arslan et al. |
| 2006/0236224 | A1 | 10/2006 | Kuznetsov et al. |
| 2007/0124265 | A1 * | 5/2007 | Hebbani et al. ............... 706/45 |

FOREIGN PATENT DOCUMENTS

| | | |
|---|---|---|
| JP | 2000253064 | 9/2000 |

| | | |
|---|---|---|
| JP | 2001285366 | 10/2001 |
| JP | 2003002298 A | 1/2003 |
| JP | 2003087336 | 3/2003 |
| WO | WO 03041365 | 5/2003 |

OTHER PUBLICATIONS

U.S. Appl. No. 11/466,478, filed Aug. 23, 2006, Matthew R. Liberty.
U.S. Appl. No. 11/128,173, filed May 13, 2005, J. Claude Caci.
U.S. Appl. No. 11/128,388, filed May 13, 2005, J. Claude Caci.
U.S. Appl. No. 11/128,165, filed May 13, 2005, J. Claude Caci.
U.S. Appl. No. 11,128,168, filed May 13, 2005, J. Claude Caci.
*IPv6 Integration and Coexistence Strategies for Next-Generation Networks*, by Malllik Tatipamula, Patrick Grossetete of Cisco Systems and Hiroshi Esaki of Tokyo University, IEEE Communications Magazine Jan. 2004, pp. 88-96.
*Study and Emulation of IPv6 Internet-Exchange-Based Addressing Models*, by David Fernandez and Tomas de Miguel, of Madrid Polytechnic University and Fermin Galan, of Agora Systems S.A., IEEE Communications Magazine, Jan. 2004, pp. 105-112.
*bDynamics*, Long Wave Incorporated, www.longwaveinc.com/products-bydynamics.htm, date unknown; pp. 1-5, downloaded May 5, 2004.
*IETM Generation from FrameMaker or Word*, Live Linx Extensible Solutions, www.livelinx.com/content/products-ietm.html, Mar. 10, 2004; pp. 1-2.
*Interactive electronic technical manual said to be world first*, Dataweek, Electronics & Communication Technology, Oct. 8, 2003, dataweek.co.za/news.asp?pkINnewsID=12301&pkIIssueID=357 &pkICategoryID=31, produced by Technews; pp. 1-11.
*On board real time Fault Detection Isolation and Reconfiguration*, www.teams-rds.com/fdir/fdir_home.htm, 2003 Qualtech Systems, Inc.; pp. 1-3.
*Interactive Electronic Technical Manual (IETM)*, Direct Reporting Program Manager Advanced Amphibious, www.efv.usmc.mil/logistics/IETM.html; pp. 1-2; downloaded May 5, 2004.
*Boeing Quill 21*, www.boeing.com/defense-space/aerospace/techdata/quill.htm; pp. 1-2; downloaded May 5, 2004.
*The recognized technology lead advanced integrated diagnostics and intelligent support system*, 2003 Qualtech Systems Inc., www.teams-rds.com/diagnostics_home.html; pp. 1-4.
Power PC® 440, *High Performance, 1000 MIPS, superscalar core for custom logic applications*, Macro Product Selection Guide from IBM Microelectronics Division, 1999 International Business Machines Corporation; pp. 1-2.
Affidavit of Richard Berbaum, Nov. 1, 2004; pp. 1-21.
Udell, Jon, *Lightweight XML Search Servers*, Jan. 21, 2004; pp. 1-7.
Qualls, Michael, *Searching an XML File with XSL and ASP*, date unknown; pp. 1-13; downloaded Mar. 16, 2010.
"XML and Search"; http://www.searchtools.com/info/xml.html, Dec. 28, 2001; pp. 1-6.

* cited by examiner

1065

```
<?xml version="1.0" encoding="ISO-8859-1" ?>
- <xsl:stylesheet version="1.0"
    xmlns:xsl="http://www.w3.org/1999/XSL/Transform">
    <xsl:output method="xml" encoding="ISO-8859-1" />
    <xsl:preserve-space elements="*" />
  - <xsl:template match="/">
    - <file>
      - <topId>
          <xsl:value-of select="translate
            (//@id,'abcdefghijklmnopqrstuvwxyz','ABCDEFGHIJKLMNOPQRSTUVWXYZ')" />
        </topId>
        <xsl:apply-templates />
      </file>
    </xsl:template>
  - <xsl:template match="*[@id]">
    - <subId>
        <xsl:value-of select="translate
          (@id,'abcdefghijklmnopqrstuvwxyz','ABCDEFGHIJKLMNOPQRSTUVWXYZ')" />
      </subId>
      <xsl:apply-templates />
    </xsl:template>
  - <xsl:template match="*">
      <xsl:apply-templates />
    </xsl:template>
    <xsl:template match="text()" />
  </xsl:stylesheet>
```

```
<?xml version="1.0" encoding="ISO-8859-1" ?>
- <xsl:stylesheet version="1.0"
    xmlns:xsl="http://www.w3.org/1999/XSL/Transform">
    <xsl:output method="text" encoding="ISO-8859-1" />
    <xsl:preserve-space elements="*" />
    <xsl:param name="id" />
  - <xsl:param name="ID">
      <xsl:value-of select="translate($id,'abcdefghijklmnopqrstuvwxyz',
      'ABCDEFGHIJKLMNOPQRSTUVWXYZ')" />
    </xsl:param>
  - <xsl:template match="/">
    - <xsl:variable name="content">
        <xsl:apply-templates />
      </xsl:variable>
    - <xsl:choose>
      - <xsl:when test="string-length($content) > 0">
          <xsl:value-of select="$content" />
        </xsl:when>
      - <xsl:otherwise>
          <xsl:apply-templates mode="output" />
        </xsl:otherwise>
      </xsl:choose>
    </xsl:template>
  - <xsl:template match="*">
    - <xsl:choose>
      - <xsl:when test="(@id)">
        - <xsl:choose>
          - <xsl:when test="translate
              (@id,'abcdefghijklmnopqrstuvwxyz','ABCDEFGHIJKLMNOPQRSTUVWXYZ')
              = $ID">
              <xsl:text><</xsl:text>
              <xsl:value-of select="name()" />
            - <xsl:for-each select="@*">
                <xsl:text />
                <xsl:value-of select="name()" />
                <xsl:text>="</xsl:text>
                <xsl:value-of select="." />
                <xsl:text>"</xsl:text>
              </xsl:for-each>
              <xsl:text>></xsl:text>
              <xsl:apply-templates mode="output" />
              <xsl:text></</xsl:text>
              <xsl:value-of select="name()" />
              <xsl:text>></xsl:text>
            </xsl:when>
```

```
    - <xsl:otherwise>
        <xsl:apply-templates />
      </xsl:otherwise>
    </xsl:choose>
  </xsl:when>
- <xsl:otherwise>
    <xsl:apply-templates />
  </xsl:otherwise>
 </xsl:choose>
</xsl:template>
- <xsl:template match="*" mode="output">
    <xsl:text><</xsl:text>
    <xsl:value-of select="name()" />
 - <xsl:for-each select="@*">
      <xsl:text />
      <xsl:value-of select="name()" />
      <xsl:text>="</xsl:text>
      <xsl:value-of select="." />
      <xsl:text>"</xsl:text>
    </xsl:for-each>
    <xsl:text>></xsl:text>
    <xsl:apply-templates mode="output" />
    <xsl:text></</xsl:text>
    <xsl:value-of select="name()" />
    <xsl:text>></xsl:text>
  </xsl:template>
- <xsl:template match="text()" mode="output">
  - <xsl:choose>
    - <xsl:when test="contains(.,'&') or contains(.,'<') or contains (.,'>')">
        <xsl:text><![CDATA[</xsl:text>
        <xsl:value-of select="." />
        <xsl:text>]]></xsl:text>
      </xsl:when>
    - <xsl:otherwise>
        <xsl:value-of select="." />
      </xsl:otherwise>
    </xsl:choose>
  </xsl:template>
  <xsl:template match="text()" />
</xsl:stylesheet>
```

```xml
<?xml version="1.0" encoding="ISO-8859-1" ?>
<xsl:stylesheet version="1.0"
  xmlns:xsl="http://www.w3.org/1999/XSL/Transform">
  <xsl:output method="text" encoding="ISO-8859-1" />
  <xsl:preserve-space elements="*" />
  <xsl:variable name="locale" />
  <xsl:variable name="LOCALE">
    <xsl:value-of select="translate
      ($locale,'abcdefghijklmnopqrstuvwxyz','ABCDEFGHIJKLMNOPQRSTUVWXYZ')"
    />
  </xsl:variable>
  <xsl:template match="/">
    <xsl:text><?xml version="1.0" encoding="ISO-8859-1" ?></xsl:text>
    <xsl:apply-templates />
  </xsl:template>
  <xsl:template match="*">
    <xsl:choose>
      <xsl:when test="contains(@locale,$locale) or contains(@locale,$LOCALE)">
        <xsl:call-template name="passThrough" />
      </xsl:when>
      <xsl:when test="not(@locale)">
        <xsl:call-template name="passThrough" />
      </xsl:when>
      <xsl:otherwise />
    </xsl:choose>
  </xsl:template>
  <xsl:template name="passThrough">
    <xsl:text><</xsl:text>
    <xsl:value-of select="name()" />
    <xsl:for-each select="@*">
      <xsl:text />
      <xsl:value-of select="name()" />
      <xsl:text>='</xsl:text>
      <xsl:value-of select="." />
      <xsl:text>'</xsl:text>
    </xsl:for-each>
    <xsl:text>></xsl:text>
    <xsl:choose>
      <xsl:when test="count(*) > 0">
        <xsl:apply-templates select="*" />
      </xsl:when>
```

```
- <xsl:otherwise>
    - <xsl:choose>
      - <xsl:when test="contains(.,'<') or contains(.,'>') or contains(.,'&')">
          <xsl:text><![CDATA[</xsl:text>
          <xsl:value-of select="." />
          <xsl:text>]]></xsl:text>
        </xsl:when>
      - <xsl:otherwise>
          <xsl:value-of select="." />
        </xsl:otherwise>
      </xsl:choose>
    </xsl:otherwise>
  </xsl:choose>
  <xsl:text></</xsl:text>
  <xsl:value-of select="name()" />
  <xsl:text>></xsl:text>
  </xsl:template>
</xsl:stylesheet>
```

```
<?xml version="1.0" ?>
- <xsl:stylesheet version="1.0"
    xmlns:xsl="http://www.w3.org/1999/XSL/Transform">
    <xsl:output method="text" encoding="ISO-8859-1" />
    <xsl:preserve-space elements="*" />
  - <xsl:variable name="applicsys">
      <xsl:value-of select="translate
      ($applicsys,'abcdefghijklmnopqrstuvwxyz','ABCDEFGHIJKLMNOPQRSTUV
      WXYZ')" />
    </xsl:variable>
  - <xsl:variable name="APPLICSYS">
      <xsl:value-of select="translate
      ($applicsys,'abcdefghijklmnopqrstuvwxyz','ABCDEFGHIJKLMNOPQRSTUV
      WXYZ')" />
    </xsl:variable>
  - <xsl:template match="/">
      <xsl:text><?xml version="1.0" encoding="ISO-8859-1" ?></xsl:text>
      <xsl:apply-templates />
    </xsl:template>
  - <xsl:template match="*">
    - <xsl:choose>
      - <xsl:when test="@applicsys">
        - <xsl:if test="translate
        (@applicsys,'abcdefghijklmnopqrstuvwxyz','ABCDEFGHIJKLMNOPQRSTUV
        WXYZ') =
        translate($applicsys,'abcdefghijklmnopqrstuvwxyz','ABCDEFGHIJKLMNOPQ
        RSTUVWXYZ')">
            <xsl:call-template name="passThrough" />
          </xsl:if>
        </xsl:when>
      - <xsl:when test="not(@applicsys)">
          <xsl:call-template name="passThrough" />
        </xsl:when>
        <xsl:otherwise />
      </xsl:choose>
    </xsl:template>
  - <xsl:template name="passThrough">
      <xsl:text><</xsl:text>
      <xsl:value-of select="name()" />
    - <xsl:for-each select="@*">
```

```
    <xsl:text />
      <xsl:value-of select="name()" />
      <xsl:text>='</xsl:text>
      <xsl:value-of select="." />
      <xsl:text>'</xsl:text>
    </xsl:for-each>
    <xsl:text>></xsl:text>
  - <xsl:choose>
      - <xsl:when test="count(*) > 0">
          <xsl:apply-templates select="*" />
        </xsl:when>
      - <xsl:otherwise>
          - <xsl:choose>
              - <xsl:when test="contains(.,'<') or contains(.,'>') or contains(.,'&')">
                  <xsl:text><![CDATA[</xsl:text>
                  <xsl:value-of select="." />
                  <xsl:text>]]></xsl:text>
                </xsl:when>
              - <xsl:otherwise>
                  <xsl:value-of select="." />
                </xsl:otherwise>
            </xsl:choose>
        </xsl:otherwise>
    </xsl:choose>
    <xsl:text></</xsl:text>
    <xsl:value-of select="name()" />
    <xsl:text>></xsl:text>
  </xsl:template>
</xsl:stylesheet>
```

*FIG. 20B*

INTERACTIVE ELECTRONIC TECHNICAL MANUAL SYSTEM WITH DATABASE INSERTION AND RETRIEVAL

This application is related to U.S. patent application Ser. Nos. 11/019,295, filed Dec. 23, 2004, and Ser. No. 11/466,478, filed Aug. 23, 2006, the entire disclosures of which are hereby incorporated herein by reference.

The present invention relates generally to database processing for diagnostics, and more particularly to database processing for interactive electronic technical manual information provided in markup language form.

In the present invention, an Interactive Electronic Technical Manual (IETM) may provide dynamic diagnostics for a complex system. Examples of a complex system include aircraft, spacecraft, vehicles, mail distribution equipment, automobile factory systems, and/or the like. In general, any system made up of multiple components requiring diagnostics may be considered a complex system. For example, an exemplary Class V IETM of the present invention may permit system domain experts, such as diagnostic engineers, to directly interact with a remote maintenance technician. The Class V IETM of the present invention may also permit in-sync operation of the application software and underlying data, display of asset specific information, and the customization of the communication protocol with the System Under Test.

An Interactive Electronic Technical Manual (IETM), as defined in the Department of Defense IETM Specifications, is a package of information required for the diagnosis and maintenance of an electronic weapons system, optimally arranged and formatted for interactive screen presentation to the end-user maintenance technician. An IETM typically contains information required by technicians to perform on-site system maintenance. With an IETM, maintenance and troubleshooting procedures, parts information, theory of operation and illustrated graphics can be loaded on a lightweight portable computer to go where the technician goes.

The information in an IETM is designed and formatted for a screen presentation that enhances comprehension. The elements of technical data making up the technical manual are interrelated such that a user's access to information within the IETM is possible by a variety of paths. The computer-controlled IETM display device, or Portable Electronic Display Device (PEDD), typically a laptop computer, operates interactively to provide procedural guidance, navigational directions and supplemental information to the end-user maintenance technician. Powerful interactive troubleshooting procedures, not possible with paper technical manuals, can be made available using the intelligent features of the PEDD.

The Department of Defense generally recognizes several classes of an IETM ranging from simple non-indexed page images (Class 0) to an intelligent integrated database information system (Class V). By definition, a Class V IETM links directly to equipment and/or a maintenance network, integrates with equipment diagnostics and expedites troubleshooting, spares ordering and maintenance planning, thereby resulting in increased equipment availability. A Class V IETM provides "Dynamic Diagnostics" by allowing the IETM to directly communicate with System Under Test (SUT), which may be comprised of one or more subsystems. A subsystem may also be referred to herein as a Unit Under Test (UUT). In an exemplary system, the SUT may be comprised of a plurality of UUTs.

Creating an IETM for today's complex electronic systems has become more complicated as modern electronic systems are frequently designed using existing Commercial Off-The-Shelf (COTS) equipment and Modified Off-The-Shelf (MOTS) designed black boxes. This design method allows a system designer to utilize readily available hardware and software components that meet operational intent. In the present invention, a Class V IETM may communicate directly with the SUT through the Built-In-Test (BIT) capabilities of the COTS or MOTS System components.

A Class V IETM of the present invention provides "Dynamic Diagnostics" by interrogating the SUT based on XML-encoded "Diagnostic Fault Flows". Diagnostic Fault Flows are described in more detail in co-pending application Ser. No. 10/998,802, entitled "Diagnostic Fault Detection and Isolation," filed Nov. 30, 2004, commonly assigned to the assignee of the present invention, the entire disclosure of which is hereby incorporated by reference. Diagnostic Fault Flows support interaction with the SUT and process the data returned from the BITs, thereby providing the ability to integrate the individual BIT results from the separate components. Thus, using the IETM of the present invention, the entire integrated system can thus be intelligently analyzed, not just individual components of the SUT. A Diagnostic Engineer associated with the development of the System typically designs the Diagnostic Fault Flows.

Diagnostic Fault Flows may comprise diagnostic logic needed to effectively detect and isolate faults. In a preferred embodiment, this logic is encoded in XML. Many fault detection and isolation tasks can be predefined and stored in an XML structure, however it is possible to create an ad hoc diagnostic procedure using XML.

The Class V IETM of the present invention provides for effective use of Diagnostic Fault Flows through an N-tier architecture. In an N-tier architecture, an application program is distributed into at least three distinct layers or "tiers" of operation. In a typical 3-tier application, the application user's computer (client tier) contains the programming that provides the graphical user interface and application-specific entry forms or interactive windows. The server tier includes a system level database and a program to manage access to it. The middleware tier is the communication "glue" between client and server layers. The middleware tier contains logic for acting as a server for client tier requests from application users. In turn, it determines what data is needed (and where it is located) and acts as a client in relation to the server tier.

Using the flexible N-tier architecture described herein, the Class V IETM of the present invention provides effective fault detection and isolation using automated interaction with the SUT. The IETM system of the present invention may include the ability for Diagnostic Engineers to interact directly with the IETM and indirectly with the SUT to assist the maintenance technician; the ability to synchronize files on maintenance technician's PEDD, providing for standalone, network centric or hybrid configurations; and/or the ability to display asset specific information.

Furthermore, embodiments can comprise a system and method for inserting document text into a database and for retrieving portions of the document text from that database. In particular, various embodiments can comprise a system and methods for generating one or more keys from selected attributes occurring in input information, and to insert output information comprising the keys into a database.

BRIEF DESCRIPTION OF THE DRAWINGS

As further discussed herein,

FIG. 17 is an example style sheet defining attributes to be used for keys according to various embodiments;

FIGS. 18A and 18B are an example style sheet used to obtain requested XML according to various embodiments;

FIGS. 19A and 19B are an example style sheet used to obtain requested XML for a particular locale according to various embodiments; and FIGS. 20A and 20B are an example style sheet used to obtain requested XML for a particular version according to various embodiments.

DETAILED DESCRIPTION

Figure 1:
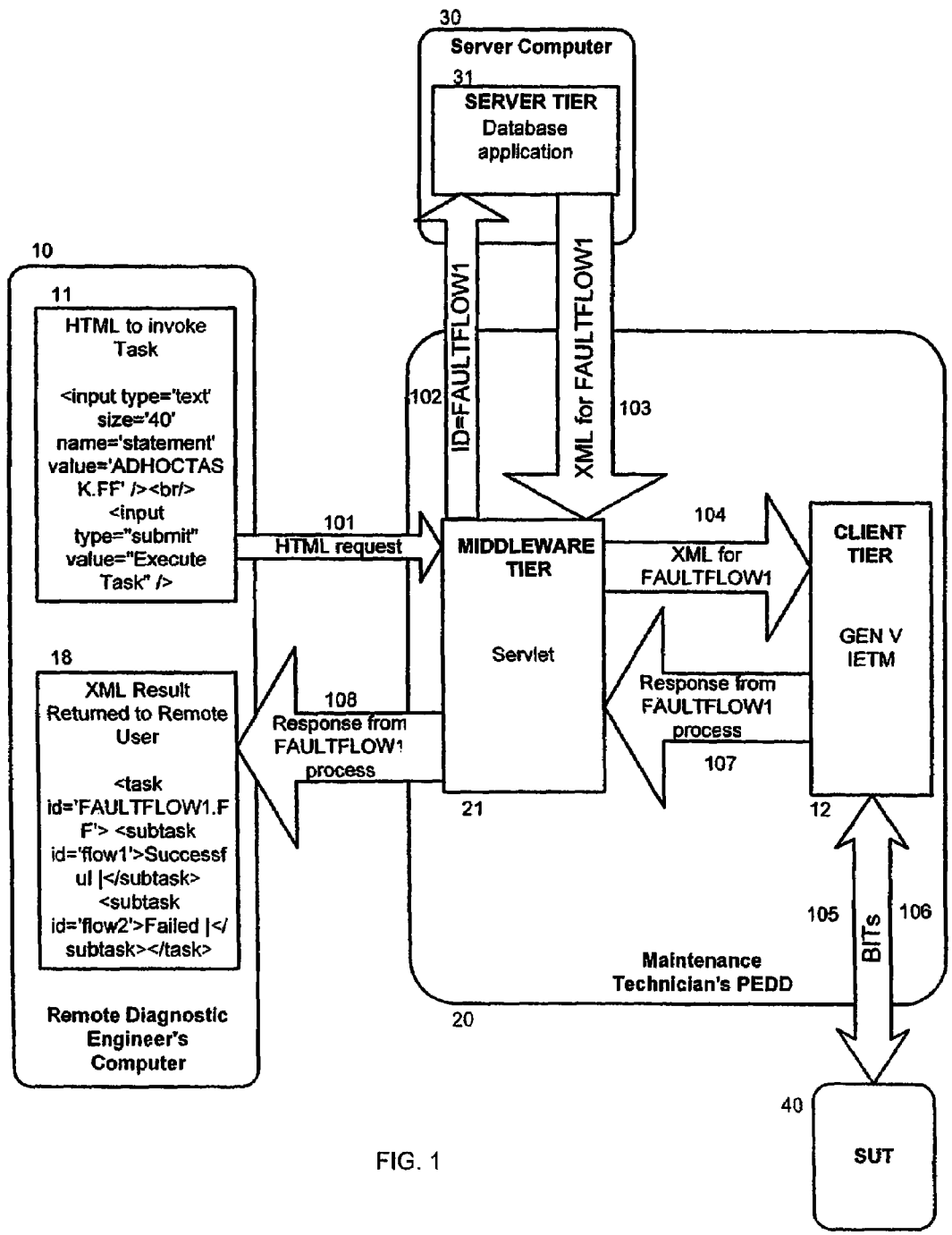
FIG. 1 illustrates one embodiment of an N-tier architecture of the present invention.

In one embodiment of the present invention, the system is deployed as a standalone program on the maintenance technician's PEDD. In this embodiment, all of the tiers (client, middleware and server) are distributed within the PEDD. In another embodiment, the client tier is distributed on the PEDD and the server tier is distributed on a network server. In this network-centric embodiment, many PEDDs could connect to the network server. The middleware tier can be distributed entirely on PEDDs, or the middleware tier may be logically distributed between a PEDD and a network server. Many different configurations will be apparent to one skilled in the art.

The server tier may be comprised of a database application. In a network-centric configuration, the database application is running on a network server supporting a plurality of PEDDs. The server tier does not necessarily have to run on a separate server computer, however. For example, in one embodiment, the server tier may be a separate software process executing on the same computer as the middleware tier.

The server tier database stores XML-encoded technical data used by the IETM; (i.e. Diagnostic Fault Flows, Manual Maintenance Procedures (e.g. Installation, Alignment, Cleaning, Remove & Replace)). These XML-encoded structures are stored by and accessed through the Server Tier database application.

All communication in the IETM of the present invention is routed through the middleware tier. The middleware tier of the present invention may be implemented using Java 2 Enterprise Environment (J2EE) servlet technology.

In a standalone configuration, the middleware tier is distributed on the PEDD, along with the server tier and the client tier. In a network-centric configuration, the middleware tier may reside on any computer in the network. As mentioned above, in one embodiment the middleware tier is logically distributed between a PEDD and a network server. In this embodiment, the middleware tier is logically divided into two components, one resident on a PEDD and one distributed on the network server. The PEDD resident component allows for "Remote Maintenance Assist HTML web access" and data/application synchronization on the PEDD. The server resident component allows for data/application synchronization on the database server back end.

The client tier may be implemented as a Java application operating on a maintenance technician's PEDD. In addition, the Java application includes a set of HTML web pages that may be accessed by geographically remote Diagnostic Engineers, discussed below.

From a hardware perspective, the PEDD plugs into the SUT. Inside of the SUT, an SUT interface provides basic diagnostic hooks into the SUT for access to raw BIT data from individual UUTs. The SUT interface provides access to UUT BIT capability and I/O testing. The inventive IETM application communicates and interrogates the SUT interface, and upon receipt of the data, interprets the individual UUT BIT data and/or a collection of multiple UUT BIT data according to the process encoded in the XML-encoded Diagnostic Fault Flows, thereby acting as a tool for supporting additional maintenance tasks.

The operation of the client tier application embeds the use of the middleware servlets to perform normal processing when responding to users/maintenance technician responses to posed questions.

Remote Maintenance Assistance

While predefined Diagnostic Fault Flows contain many likely scenarios, not all permutations of BIT data responses, maintenance technician responses, IETM settings and System Configurations can be covered by the predefined Diagnostic Fault Flows. For example, during execution of a Diagnostic Fault Isolation Task, it is possible that a situation may be encountered wherein the pre-stored Diagnostic Fault Isolation Tasks cannot properly diagnose the problem. In these situations, the maintenance technician may require additional assistance to diagnose the problem.

Figure 2:
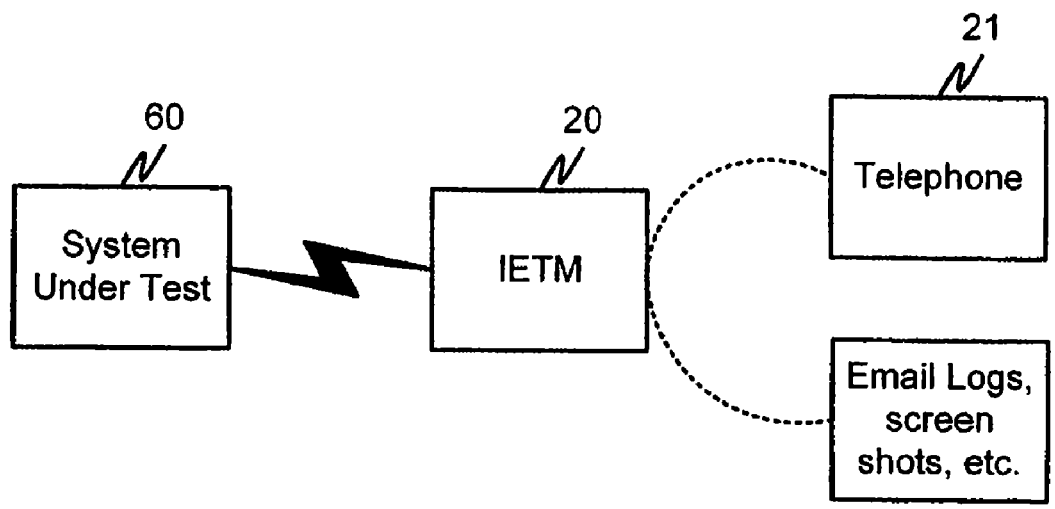
FIG. 2 illustrates how a maintenance technician communicates with external sources to get assistance in an IETM.

Before the IETM of the present invention, when an IETM being used by a maintenance technician could not properly diagnose a problem, the maintenance technician might contact a "Help Desk" or other source of technical assistance by telephone to walk through a problem. Alternatively or in addition to Help Desk assistance, the maintenance technician could email fault logs, capture screenshots, or send other information to technical assistance personnel. This is shown in FIG. 2, by SUT 60, standalone IETM 20 and communications 19 outside the IETM.

Figure 3:
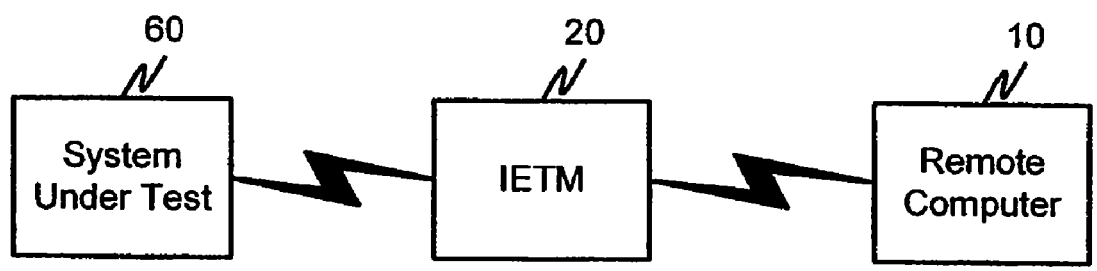
FIG. 3 illustrates how a remote Diagnostic Engineer is able to communicate with an IETM of the present invention in order to assist the maintenance technician.

The present invention allows Diagnostic Engineers located remotely from the maintenance technician and the SUT to interact directly with the IETM, and thereby indirectly with the SUT, in order to assist the maintenance technician. FIG. 3 illustrates this direct connection between the remote Diagnostic Engineer 10 and the IETM application on the maintenance technician's PEDD 20. This Remote Maintenance Assistance feature of the IETM of the present invention is preferably implemented through the N-tier architecture described above.

From any networked location, the remote Diagnostic Engineer is able to communicate with the PEDD to perform diagnostic tasks on the SUT. These tasks are typically XML-encoded tasks that require the PEDD to communicate with the SUT. In one configuration of the inventive system that supports Remote Maintenance Assistance, the Diagnostic Engineer accesses a standard HTML webpage. The HTML webpage acts as part of the client tier, connecting to the PEDD's middleware tier. This access can be through a Java Servlet request, for example.

In a preferred embodiment, PEDD-based HTML pages can be accessed by the remote Diagnostic Engineer allowing nearly the same capabilities as the local maintenance technician. However, if a maintenance task requires the physical activation of a button, the local maintenance technician must perform that operation.

FIG. 1 shows an example of one embodiment of the IETM system of the present invention. In particular, the three tiers of the n-tier architecture of the present invention are a client tier 12, a middleware tier 21 and a server tier 31. In the example shown in FIG. 1, these three tiers are distributed between a network server 30 and maintenance technician's PEDD 20, and communicate with a remote Diagnostic Engineer's computer 10.

The diagnostic tasks requested by the remote Diagnostic Engineer may be predefined or they may be "ad hoc". FIG. 1 illustrates the communication that occurs within the system when a remote Diagnostic Engineer requests a predefined, stored task to be performed by an IETM of the present invention.

In the example shown in FIG. 1, the Diagnostic Engineer uses his networked computer 10 to access a website and request a particular predefined task, "FAULTFLOW1". The HTML that could be used to invoke the predefined "FAULTFLOW1" process stored in the server tier database is shown in block 11 of FIG. 1. "FAULTFLOW1" is the identifier used by the middleware tier and server tier to identify the database-resident task to be executed remotely.

Predefined tasks are stored in the server tier database. In order to gain access to the database of XML-encoded technical data, a normal HTTP request is made from the Client Tier to the Middleware Tier. This is shown in FIG. 1 as communication 101. The request is customized to request an external identifier (xrefid). The xrefid is the identifier of the database-resident task to be executed on the PEDD. In the example shown in FIG. 1, the xrefid is "FAULTFLOW1.FF". The request may have optional parameters specifying a system design variant, and/or a language locale.

This HTML request is received by the Middleware Tier servlet 21 operating on the maintenance technician's PEDD 20. The Middleware Tier database servlet 21 gains access to the specified XML-encoded object contained with the Server Tier database by parsing the parameters of the Client Tier's HTTP request. In the example shown in FIG. 1, the servlet processes the request by requesting the XML-encoded task identified by the label "FAULTFLOW1" from the server tier database application 31 in communication 102.

The example shown in FIG. 1 illustrates a configuration in which Server Tier 31 is resident on a separate network server computer 30. It will be apparent to those skilled in the art that alternative configurations are possible. For instance, the server tier component, including the database of XML-encoded data, could be resident on the PEDD 20. In this configuration, the server tier software component and the middleware tier software component may operate as separate processes running on the PEDD.

The requested content is preferably forwarded to the appropriate middleware tier 21 control process via an internal TCP/IP socket in communication 103. During the processing, the optional parameters are parsed, which may result in additional constraints levied on the XML returned from the Server Tier database application 31. The XML-encoded data is preferably returned over HTTP to the Middleware Tier.

As shown in FIG. 1, the client tier application 12 on PEDD 20 receives the requested XML-encoded diagnostic process procedure 104 from the middleware tier 21 and initiates any requested diagnostic processes on the SUT 60 in communication 105. SUT 60 responds to the client tier 12 with the requested information in communication 106. The requested SUT procedures are typically BIT procedures, and the XML-encoded diagnostic process may contain multiple BIT procedures, so communications 105 and 106 may occur several times for a single process request. Communications 105 and 106 are specified by a configuration file and may use a standard hardware network connection, such as, for example, RS232, Ethernet, and/or the like, and a communications protocol, such as, for example, UDP/IP, TCP/IP and/or the like. However, it should be appreciated that communications 105 and 106 may be accomplished using any known or later developed elements capable of communicating data, including a wired or wireless element, and/or any known or later developed communications protocols suitable for implementing the communications 105 and 106 in accordance with the contemplated use of the present invention.

The middleware tier 21 waits for a response 107 from the client tier application 12 that indicates the results of the entire diagnostic process. This result is forwarded to the remote Diagnostic Engineer in communication 108. Communication 108 may have HTML content, or alternatively may be XML with a style sheet. FIG. 1 illustrates an example of XML results that may be returned. As shown by box 18, in this example the diagnostic process "FAULTFLOW1.FF" was successful, however subtask "flow2" within the diagnostic process FAULTFLOW1 failed.

Figure 4:
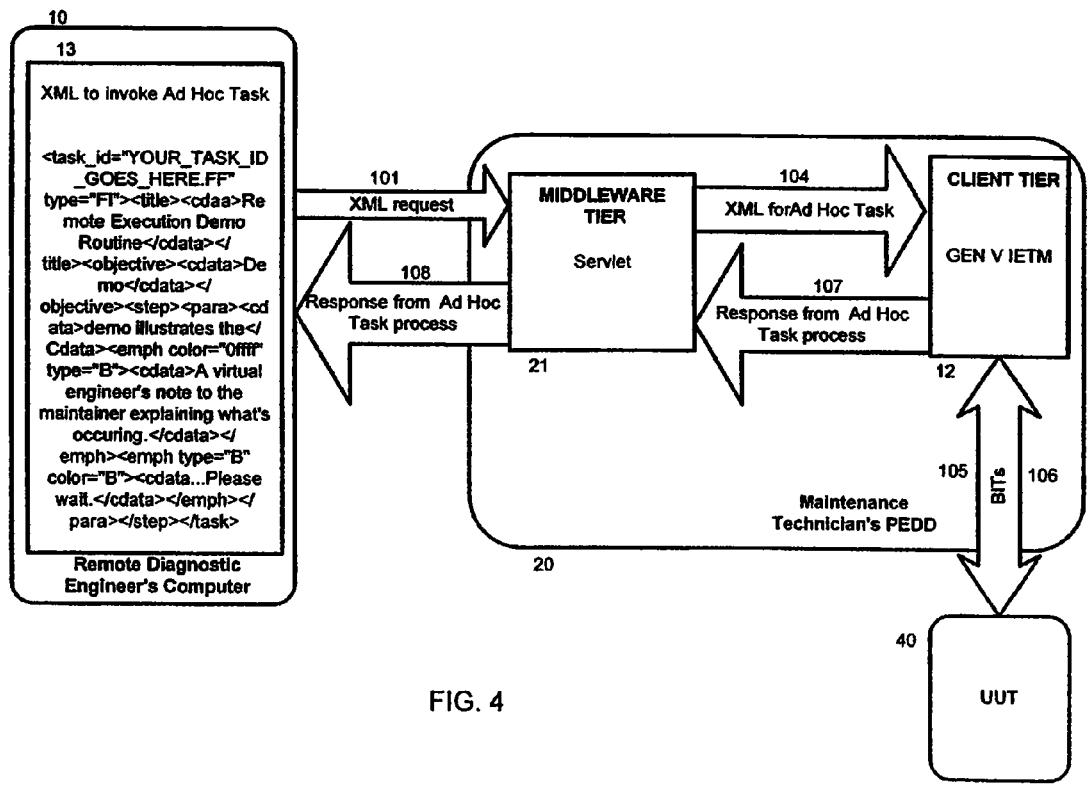
FIG. 4 illustrates a standalone embodiment of the N-tier architecture of the present invention.

As mentioned above, the Remote Maintenance Assistance feature of the present invention may invoke a pre-stored task or an ad hoc task. When invoking a pre-stored task, the Middleware servlet interprets the HTTP request that includes the identifier of the database-resident task, as described above. In contrast, ad hoc tasks may be directly requested through well-formed XML that contains specific instructions to initiate the task to be executed remotely. FIG. 4 illustrates an example of ad hoc task processing. As shown in FIG. 4, the Middleware Tier servlet 21 processes the ad hoc request 13, forwards the processed content to the appropriate client tier control process 12 via an internal TCP/IP socket and waits for a response. In this ad hoc task-processing configuration, it may be possible that the system will not check XML syntax in a request, and it is therefore the Diagnostic Engineer's responsibility to ensure that the proper XML structure is adhered to.

In-Sync Operation

IETMs are typically stand-alone applications that the maintenance technician uses during the execution of maintenance actions. The "standalone" operational restriction is typical for the operational environment where the emission of electronic communication is not allowed. IETM software and data are typically upgraded through distribution of a Compact Disk (CD) or Digital Video Disk (DVD) to ensure that there are no electronic signal emissions.

However, while not in the operational environment, it is possible for the IETM PEDD to be "docked" or connected to a network. When the IETM PEDD is docked, communications may occur through a wired connection. It is while the IETM has network connectivity that the Middleware Tier provides for synchronization of information reposed in the Server Tier's underlying database, or updates to the Client Tier application resident in the PEDD.

This "In-Sync" feature allows the IETM of the present invention to operate in multiple deployed scenarios, such as Standalone, Network-centric or Hybrid. In a Standalone configuration, the server tier software and the IETM XML data is stored locally on the maintenance technician's PEDD. In a Network-Centric configuration, the server tier software and the IETM XML data is located on a network server. In a Hybrid configuration, the server tier software and the IETM XML data is stored on both the network server and the PEDD. The hybrid configuration allows the maintenance technician to continue working even if the network is unreliable. The IETM of the present invention allows many different configurations and the flexibility to work in many different communications environments.

The In-Sync feature of the present invention allows for a hybrid configuration. The In-Sync feature ensures that local files on a PEDD are up-to-date and configured appropriately for the SUT.

To implement the "In Sync" feature, the servlets of the Middleware Tier are customized to move files from a remote location to the maintenance technician's PEDD upon request. The "In-Sync" process initiates a Web servlet on the maintenance technician's PEDD and indicates what files are to be copied from a remote machine. The servlet ensures that any downloaded files are copied to the correct location on the PEDD. Preferably, version information of downloaded files is also stored on the PEDD. Downloading updated files allows the IETM of the present invention to operate in the hybrid mode.

The In-Sync feature also allows for uploads. Uploads may be required when a customer or user requires a change, such as, for example, a change to the "look and feel" (e.g. style sheet updates), technical data (e.g. support files, manual XML data, diagnostic XML data, and/or the like), and/or support application upgrades (e.g. Adobe™ Acrobat™ reader software, Active CGM plug-in, and/or the like). The In-Sync feature may also initiate any needed special processing, such as placing a file in a certain location or indicating a system command to be performed.

The In-Sync operation is automated and customizable. Updates to the maintenance technician PEDD data and applications can be scheduled. For example, the system can check every time a PEDD is "docked" for any updates to be downloaded or uploaded. Alternatively, updates can be configured to occur on a cyclical schedule.

Figure 9:
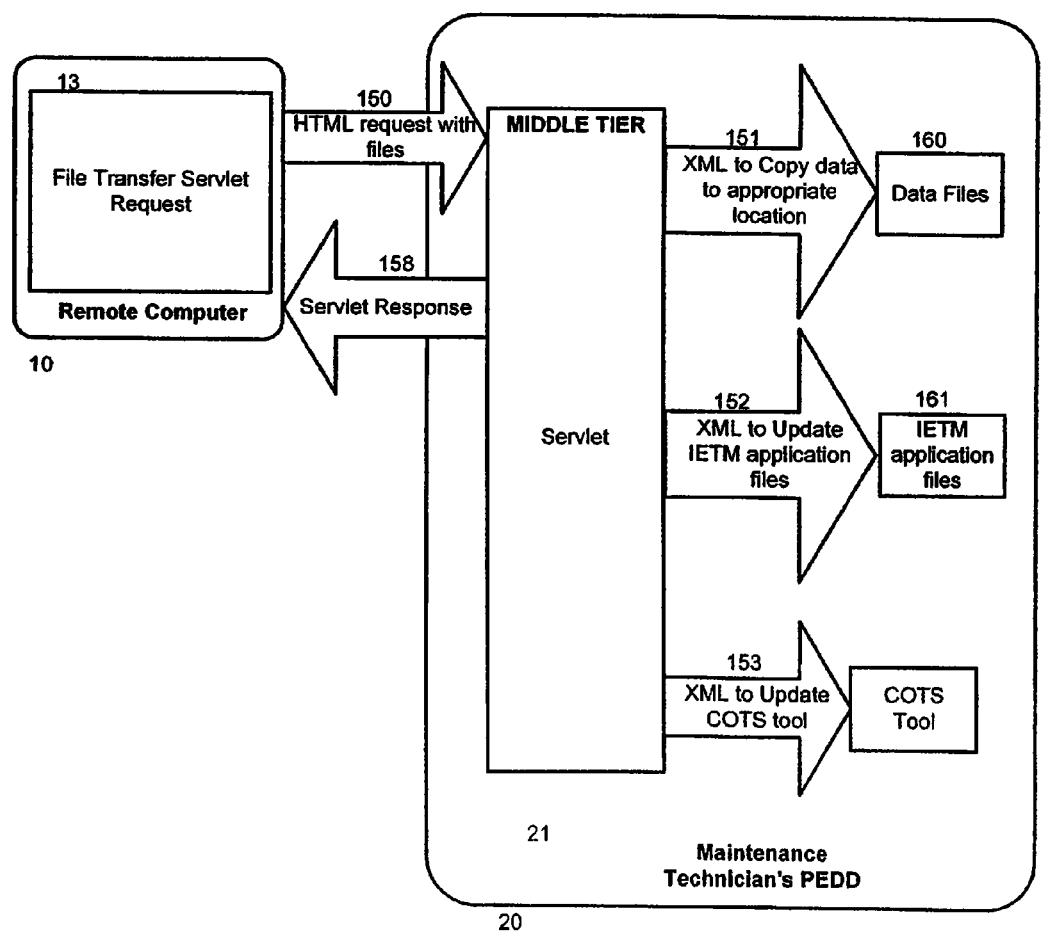
FIG. 9 illustrates the XSL filtering process used by the present invention.

FIG. 9 illustrates the process that can be used to implement the In-Sync feature. As shown, a request is made on a machine 10 remote from the PEDD to either download or upload files from the PEDD. Remote machine 10 could be a Diagnostic Engineer's computer for example. Alternatively, remote machine 10 could be a network server.

Typically, there are three different types of files that are downloaded to a PEDD in a request. First, support files that assist in loading of the Server Tier database can be downloaded. Second, data files that are loaded into and managed by the Server Tier database can be downloaded. Third, application executable files can be downloaded. The request can be for a single file to be downloaded a single time, or the request can be part of an automated "bulk" update that contains many changes.

FIG. 9 illustrates how each of these types of updates can be implemented. As shown, if a data file, such as a new XML-encoded Diagnostic Fault Flow, is to be added to a local Server Tier database of a PEDD, this can be accomplished through block 151. If the IETM application executables are being updated to a new version, this can be accomplished through block 152. If a COTS or MOTS box needs to be updated, this is accomplished through block 153.

Asset Specific Information Display

In the present invention data displayed by the application can be controlled dynamically. This allows the system to provide specific information to a maintenance technician for a particular design and/or specific modification to a particular asset in the SUT. In addition, this feature allows the support information to be displayed in multiple languages.

In one embodiment, this feature allows for version control of the IETM software and the data used by the IETM. For example, a SUT may contain many components that can potentially have many versions of interface software.

The present invention may use an eXtensible Stylesheet Language (XSL) filtering process to allow for dynamic visualization and filtering of data. XSL is a language for creating a style sheet document that may transform and/or format XML data for presentation to a user. XSL gives a developer the tools to describe exactly which data fields in an XML file to display and exactly where and how to display them. An XSL translator takes XML and runs it through a specified style sheet. The output from the style sheet may be HTML, XML, text, Rich Text Format (RTF), or other format.

In the present invention, the manuals and technical data used in the Dynamic Diagnostics process are in the form of XML. By using an XSL filtering process, separate databases are not necessary to control version information. Keys can be used to identify each version's unique data. The XSL translation uses the key to only pull the data that is unique to that key. In addition, the XSL translation can pull data that does not have a key. This data is considered to be common to all versions.

Table 1 illustrates XML that could be used to identify a graphic that is common to all versions.

TABLE 1

Common XML

```
<step>
    <graphic id="AVI.picture">
        <title>
            <cdata> PRIMARY BUS Location Diagram
            </cdata>
```

TABLE 1-continued

Common XML

```
      </title>
        <grphprim filename="30003" />
      </graphic>
  <step>
```

Table 2 illustrates an example that uses keys to identify a version 1 and a version 2 of the graphic. In this example, the key "applicsys" is used by the XSL during translation to identify the particular version of the graphic for that system.

TABLE 2

XML with Version History

```
<step>
  <graphic id="AVI.picture">
    <title>
      <cdata> PRIMARY BUS Location Diagram
      </cdata>
    </title>
    <grphprim applicsys="Version 1" filename="30003" />
    <grphprim applicsys="Version 2" filename="30003a" />
  </graphic>
<step>
```

Table 3 illustrates how the combined data is translated by the XSL filtering process of the present invention when "Version 2" is used as the translation key. The filtered data in Table 3 is presented to the user after the XSL filtering process filters out "Version 1" XML data.

TABLE 3

XML filtered through XSL translator

```
<step>
  <graphic id="AVI.picture">
    <title>
      <cdata> PRIMARY BUS Location Diagram
      </cdata>
    </title>
    <grphprim applicsys="Version 2" filename="30003a" />
  </graphic>
<step>
```

Common XML without a key (step and title in this example) are pulled, but only the grphprim with "Version 2" is displayed.

Figure 5A:
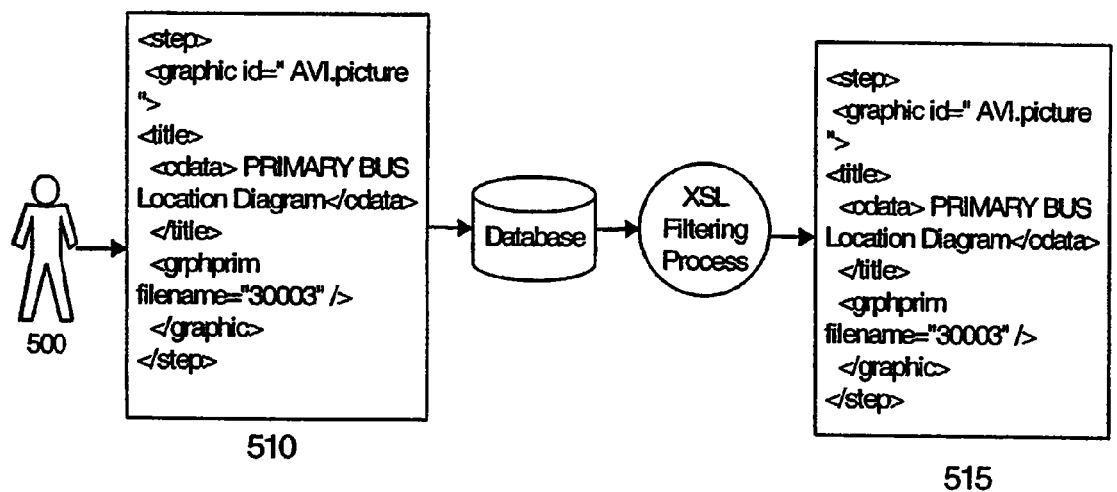
FIGS. 5A and 5B illustrate the XSL filtering used by the present invention to allow for dynamic version control.
Figure 5B:
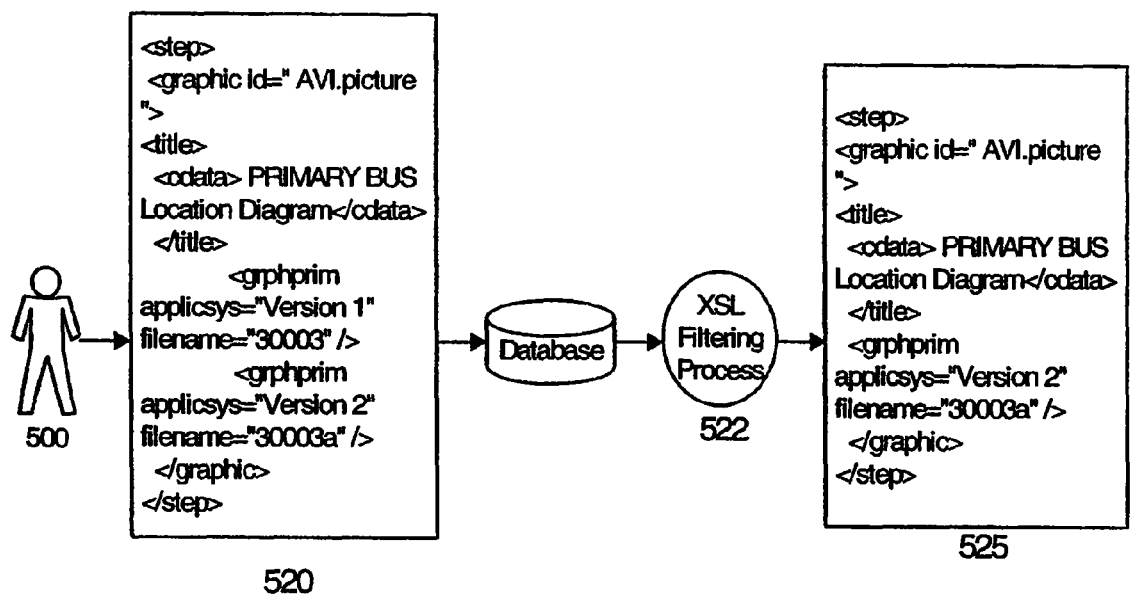

FIGS. 5A and 5B illustrates the XSL filtering process of the present invention. FIG. 5A illustrates the original XML data. As shown, the XML writer 500 writes the XML 510 to display the original documentation prior to any version changes. As shown by XML 515, the XML documentation is not filtered, and is displayed as written. FIG. 5B illustrates how the XSL filtering process can be used to filter changes to the XML such that only correct information for the current SUT is displayed. As shown in FIG. 5B, the XML 520 is updated to include version information. The XSL filtering process 522 includes the key "Version 2". The XML after filtering 525 includes only XML for Version 2. If no key is used, all data requested would be received (i.e. both Version 1 and Version 2).

The XSL filtering process also allows for language filtering within an IETM. Instead of having multiple databases for each supported language and maintaining each database, one database can be used with keys to identify the desired language. A key similar to version control is used to perform XSL filtering for language. Each supported language has a key to identify the language within the XML. If the data does not contain a language key, it is considered common data and is shown in all languages.

Figure 6:
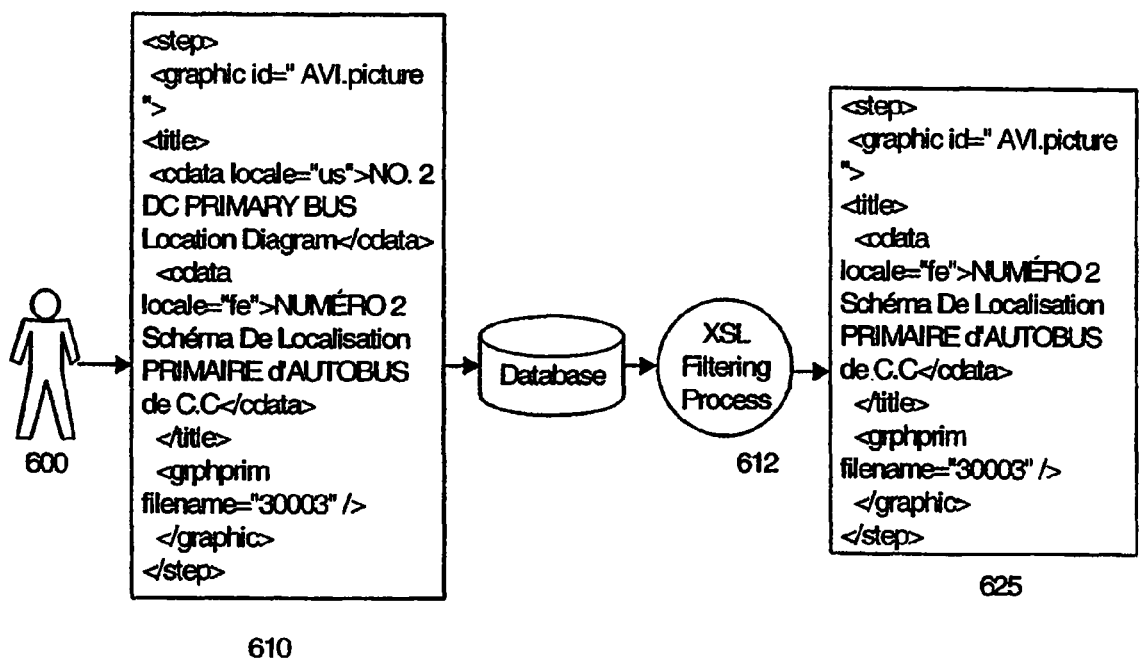
FIG. 6 illustrates the XSL filtering used by present invention to allow for dynamic language customization of the IETM.

FIG. 6 illustrates Language Filtering for French. As shown, the XML writer 600 adds French text to the XML data 610, and uses the key "fe" for French and "us" for English. As shown by the filtered XML 625, the <cdata> tag for an English location has been removed from the presented data during the XSL filtering process 612.

Figure 7:
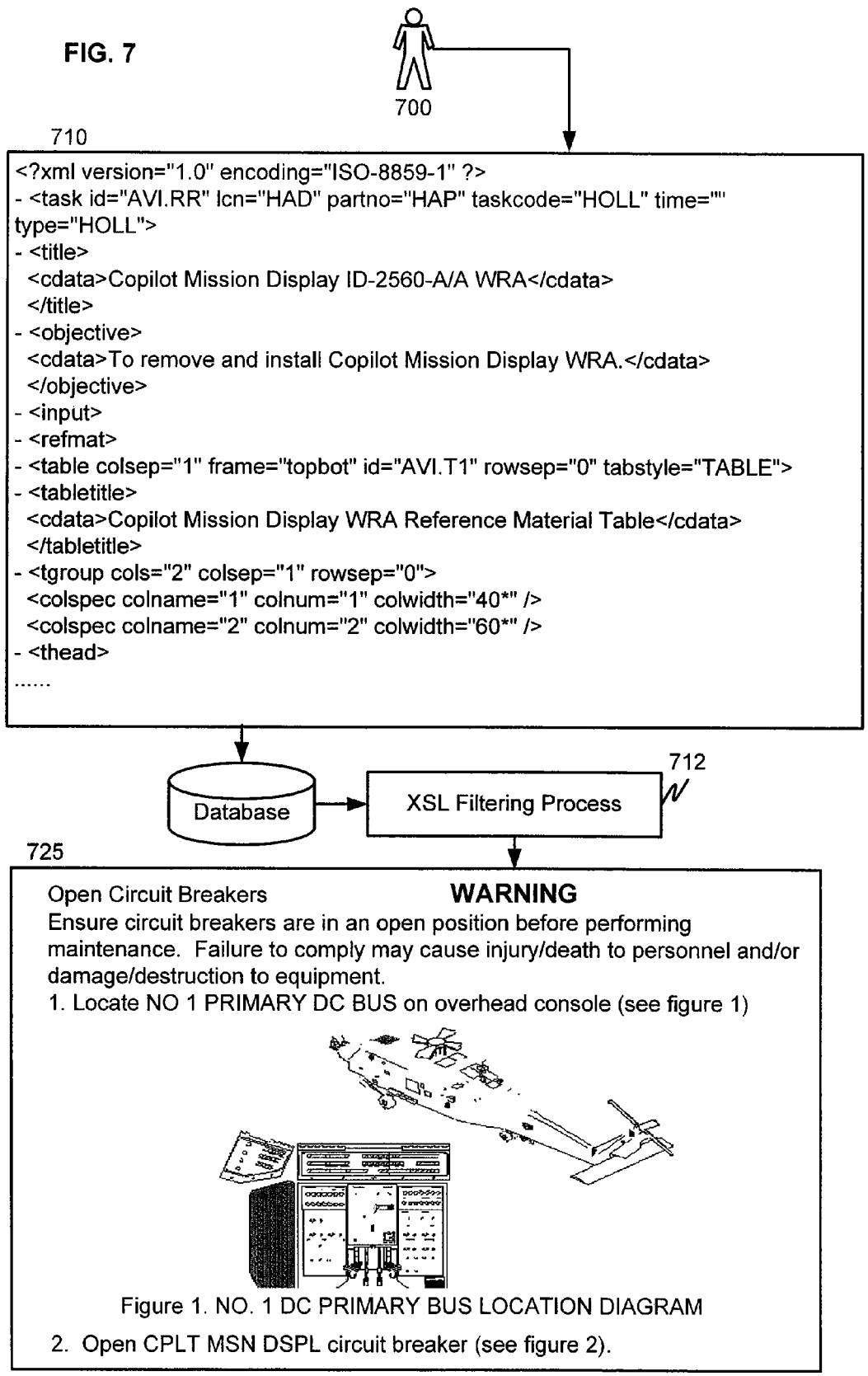
FIG. 7 illustrates the XSL filtering used by the present invention to allow for printing XML data in RTF format.

The XSL filtering process can also be used to translate the XML data into a RTF format. As shown by FIG. 7, the XSL filtering process 712 takes the XML 710 and uses an XSL style sheet to encode the data into a presentable RTF file 725 that can be printed through any RTF viewer, such as Microsoft Word. This is a significant advantage as XML in its native format is not printer-friendly, as shown by 710.

Database Insertion and Retrieval

Figure 10:
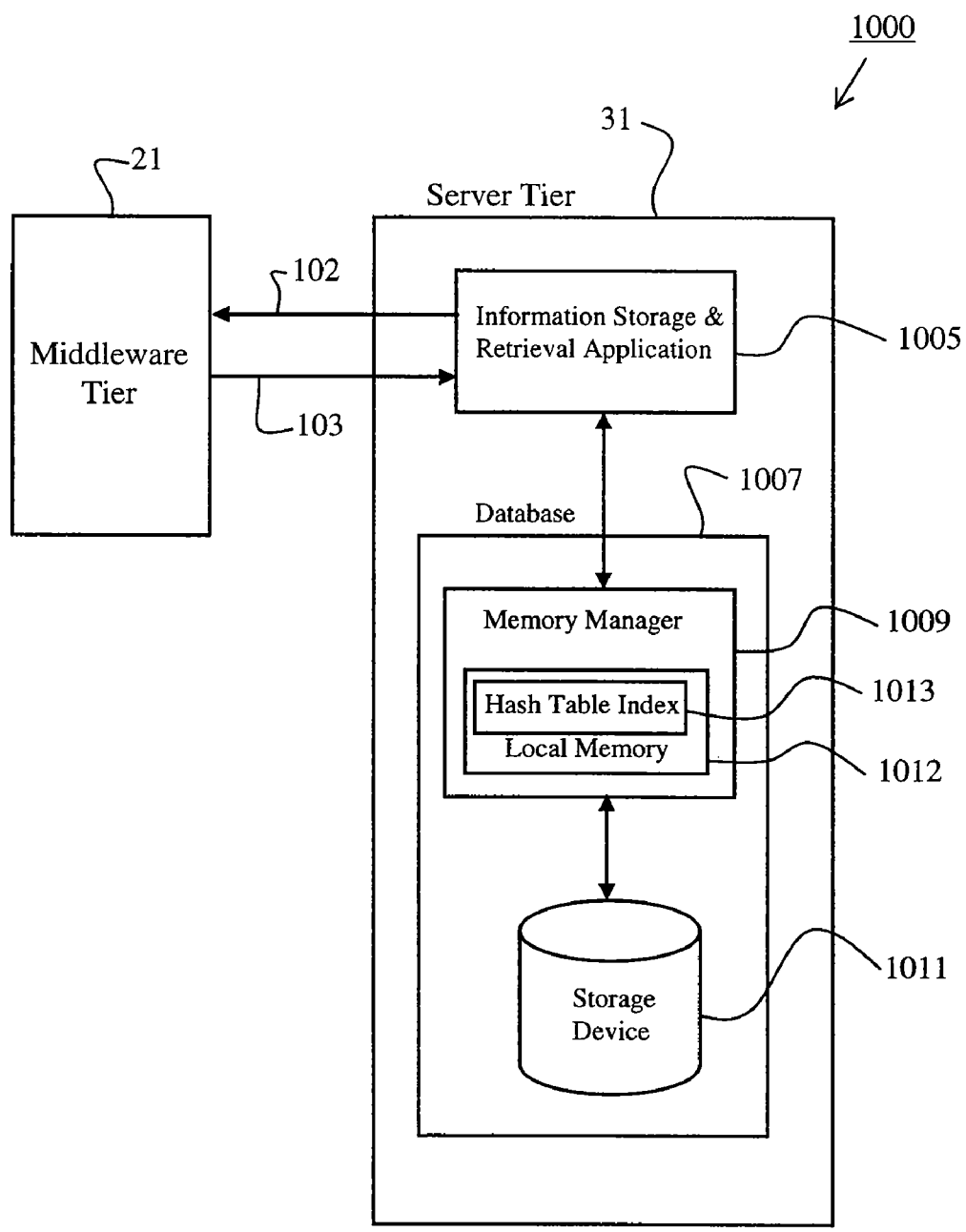
FIG. 10 is a system block diagram of a database insertion and retrieval portion according to various embodiments.

With respect to FIG. 10, there is shown the Server Tier database application 31 further comprising a database insertion and retrieval portion 1000 according to various embodiments. As shown in FIG. 10, the Server Tier database application 31 can be provided in communication with the Middleware Tier database servlet 21 using the interfaces 102 and 103 as described herein with respect to FIG. 1. In various embodiments, the Server Tier database application 31 can comprise an information storage and retrieval portion 1005 provided in communication with the Server Tier database 1007. The Server Tier database application 31 can further comprise a communication interface configured to accomplish packet-based communication using the interfaces 102 and 103.

In various embodiments, the information storage and retrieval portion 1005 can comprise one or more servlets that includes a sequence of programmed instructions that, when executed by a processor, cause the processor to be configured to perform database insertion and retrieval functions as described herein.

The Server Tier database 1007 can comprise a memory manager 1009 and a storage device 1011 provided in communication with the memory manager 1009. In various embodiments, the Server Tier database 1007 can store and retrieve information or data in response to one or more (Structured Query Language) SQL instructions. The storage device 1011 can comprise a hard disk drive configured to store information in accordance with SQL. Further, the memory manager 1009 can comprise a database manager that includes a local memory 1012. In various embodiments, the memory manager 1009 local memory 1012 can comprise a hash table index 1013 and recently accessed database information from the storage device 1011. In various embodiments, the local memory 1012 of the memory manager 1009 can have a faster access time latency than the storage device 1011. For example, the local memory 1012 can comprise a Random Access Memory (RAM) and the storage device 1011 can comprise a hard disk drive, in which case the local memory 1012 can have an access time latency on the order of ten times faster than the storage device 1011. In various embodiments, the local memory 1012 can comprise a fixed memory size specified by a target threshold size parameter. The memory manager 1009 can be configured to remove the oldest information in local memory 1012 to provide capacity to store the transformed information and maintain the size of the local memory 1012 below the target threshold size. The target threshold size and the frequency of checking whether or not the target threshold size has been exceeded can each be configurable parameters controlled by the user.

Figure 11:
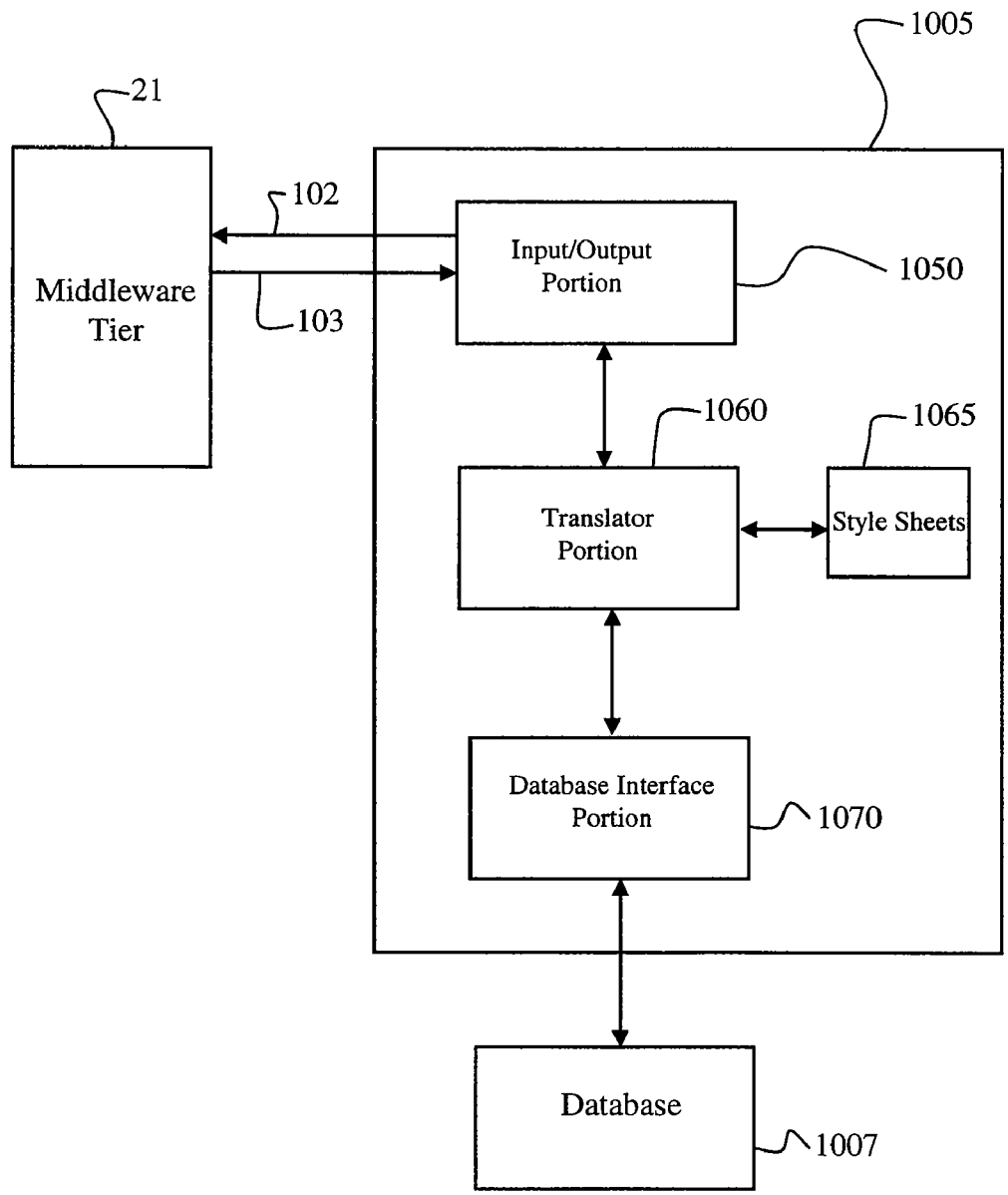
FIG. 11 is a functional block diagram of the information storage and retrieval application according to various embodiments.

With respect to FIG. 11, there is shown a functional block diagram of the information storage and retrieval portion 1005 according to various embodiments. As shown in FIG. 11, in various embodiments, the information storage and retrieval application 1005 can comprise an input/output portion 1050, a translator portion 1060, and a database interface portion 1070. In various embodiments, input/output portion 1050, a translator portion 1060, and a database interface portion 1070 can comprise one code object. In various alternative embodiments, each of the portions 1050, 1060 and 1070 can comprise multiple objects provided in communication using, for example, interprocess communication techniques.

In various embodiments, the input/output portion 1050 can comprise a sequence of Java™ instructions that configure the information storage and retrieval application 1005 to input and output information in accordance with the HyperText Transfer Protocol (HTTP). Other embodiments are possible. For example, in various alternative embodiments, the information storage and retrieval application 1005 can comprise one or more Common Gateway Interface (CGI) scripts.

Further, in various embodiments, the translator portion 1060 can comprise a markup language translator configured to read input information and translate the input information into output information in accordance with translation instructions. In various embodiments, the input information and output information can be a text stream formatted in accordance with the Extensible Markup Language (XML) markup language. Further, the markup language translator can be configured to perform Extensible Style Language Transformation (XSLT) in accordance with translation instructions specified by one or more Extensible Style Language (XSL) style sheets 1065. The translator portion 1060 can accept the input information as an input file or as a document contained in an input file. The translator portion 1060 can provide the output information as an output file. The translator portion 1060 can thus operate as an XSLT parser configured to translate a first XML document into a second XML document, for example. In various embodiments, the style sheets 1065 can be instantiated at time of application installation. In various embodiments, the style sheets 1065 are maintained in non-volatile storage of the server 30, but are not included in the database 1007.

In various embodiments, the database interface portion 1070 can be configured to communicate with the database 1007. For example, the database interface portion 1070 can be configured to generate and output to the database 1007 an information storage request or an information retrieval request. The information storage and information retrieval requests can be formatted in accordance with the Structured Query Language (SQL). Database requests from the database interface portion 1070 can be received by the memory manager 1009 of the database 1007. In various embodiments, the database interface portion 1070 can comprise a Java™ servlet.

In operation, in various embodiments, the translator portion 1060 can be configured to receive input information and translate the input information, in accordance with translation instructions specified by one or more style sheets 1065, into output information to be stored in the database 1007. In particular, the translator portion 1060 can be configured to generate a key from an attribute occurring in the input information, the input information being formatted in accordance with a markup language. In various embodiments, the key can be an index key used for retrieving the output information from the database 1007. A different key can be associated with each of many different types of attributes. In various embodiments, the attributes in the input information that are used by the translator portion 1060 to generate the keys can be defined in one or more style sheets 1065. The style sheets 1065 can be customized to generate keys from a variety of attribute types according to the needs of the user. FIG. 17 is an example style sheet 1065 defining attributes to be used for keys according to various embodiments.

Furthermore, style sheets 1065 can be used to specify to the translator portion 1060 the manner in which to add the keys to a hash table index. In various embodiments, the hash table index can comprise an internal database index.

Figure 12:
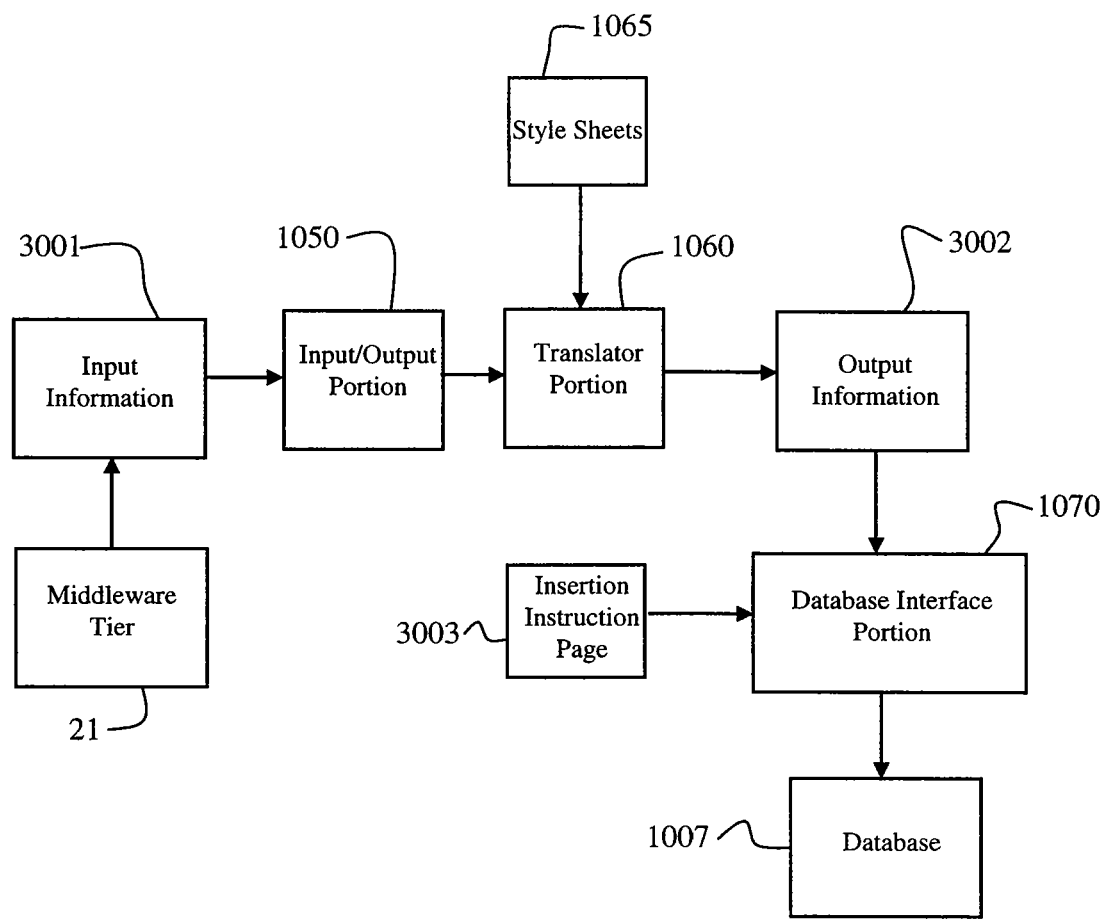
FIG. 12 is a database insertion functional flow diagram according to various embodiments.

With respect to FIG. 12, there is shown a database insertion functional flow diagram in accordance with various embodiments. As shown in FIG. 12, the translator portion 1060 can receive the input information 3001 and apply a first style sheet 1065 to generate keys based on occurrences of the attribute(s) specified in the first style sheet 1065. A key can comprise an identifier that serves to identify the information, such as markup language data or a tag, associated with the corresponding attribute. In various embodiments, the translator portion 1060 can be configured to generate one such identifier for every occurrence of the corresponding attribute in the input information 3001. Each such generated identifier can be included in the output information 3002. Thus, the output information 3002 generated by the translator portion 1060 can comprise one or more of the identifiers, each of which each identifiers corresponds to an occurrence of the selected attribute(s) in the input information 3001, each of which identifiers identifies the information associated with the attribute in the input information 3001, and each of which identifiers is added or inserted into the database 1007. In various embodiments, the output information 3002 can comprise keys in a hash table index. A second style sheet 1065 can be used to specify to the translator portion 1060 the manner in which to add the keys to a hash table index. The hash table index can comprise an internal database index.

In various embodiments, the database interface portion 1070 can be configured to apply an insertion instruction page 3003 to select insertion of the output information 3002 into the database 1007 as either a single document or file, or as several compressed documents or files. The insertion instruction page 3003 can comprise a markup language file such as, for example, a HyperText Markup Language (HTML) page. The database interface portion 1070 can then upload the input information 3001 for insertion into the database 1007. In various embodiments, the database interface portion 1070 can comprise a Java™ servlet. The input information 3001 can comprise XML formatted information. In various embodiments, the input information 3001 can be compressed using a compression algorithm such as, for example, the java.util.zip Java™ compression utility of the Java™ 2 Platform Std. Ed. v1.4.2 available from Sun Microsystems of Santa Clara, Calif. In various alternative embodiments, another ZIP compression algorithm can be used such as, for example, PKZIP available from PKWARE, Inc. of Milwaukee, Wis., or the WinZip™ product available from Microsoft Corporation.

Furthermore, in various embodiments, the translator portion 1060 can be configured to generate multiple levels of identifiers. Each level of identifiers can be hierarchically related to another one of the levels (for example, the immediately preceding level or the immediately following level). In various embodiments, a top-level identifier can serve to identify an entire input information 3001 file such as, for example, an XML file. Multiple sub-level identifiers can be provided, wherein each sub-level identifier serves to identify any XML in the input information 3001 that meets the attribute criteria specified in the applicable style sheet 1065. Further, the translator portion 1060 can be configured to index all of the identifiers, or keys, by associating each sub-level identifier with its immediately preceding (for example, next highest priority) sub-level identifier, and by associating each sub-level identifier with its top-level identifier.

Example input information 3001 is set forth in Table 4 below. As shown in Table 4, the input information 3001 can comprise an XML file.

TABLE 4

Input Information

```
<?xml version='1.0' encoding='ISO-8859-1'?>
<task ID="my.test" type="merc">
<title><cdata>Tests my links</cdata></title>
<objective><cdata>testing my links</cdata></objective>
<subtask ID="my.test.link">
<title><cdata>linktest</cdata></title>
<step>
</step>
</subtask>
<subtask ID="my.test.run">
<title><cdata>run my test</cdata></title>
<step>
</step>
</subtask>
</task>
```

Upon receiving the input information 3001 shown in Table 4, the translator portion 1060 can apply the first style sheet 1065 to generate the identifiers. For example, if the style sheet 1065 specifies the "ID" attribute in the input information 3001 to be used to generate identifiers, the translator portion 1060 can generate one identifier for every occurrence of the "ID" attribute encountered in the input information 3001. Each generated identifier is included in the output information 3002. Thus, the output information 3002 generated by the translator portion 1060 can comprise one or more of the identifiers, each of which each identifiers corresponds to an occurrence of the selected attribute(s) in the input information 3001, each of which identifiers identifies the information associated with the attribute in the input information 3001, and each of which identifiers is added or inserted into the database 1007.

In various embodiments, the output information 3002 can comprise keys in a hash table index. A second style sheet 1065 can be used to specify to the translator portion 160 the manner in which to add the keys to a hash table index. The hash table index can comprise an internal database index. In various embodiments, the hash table index can be stored using the hash table 1013 of the memory manager 1009.

Example output information 3002 is set forth in Table 5 below. As shown in Table 5, the output information 3002 can comprise an XML file.

TABLE 5

Output Information

ID = "my.test", Top-level = "my.test"
ID = "my.test.link", Top-level = "my.test"
ID = "my.test.run", Top-level = "my.test"

Figure 13:
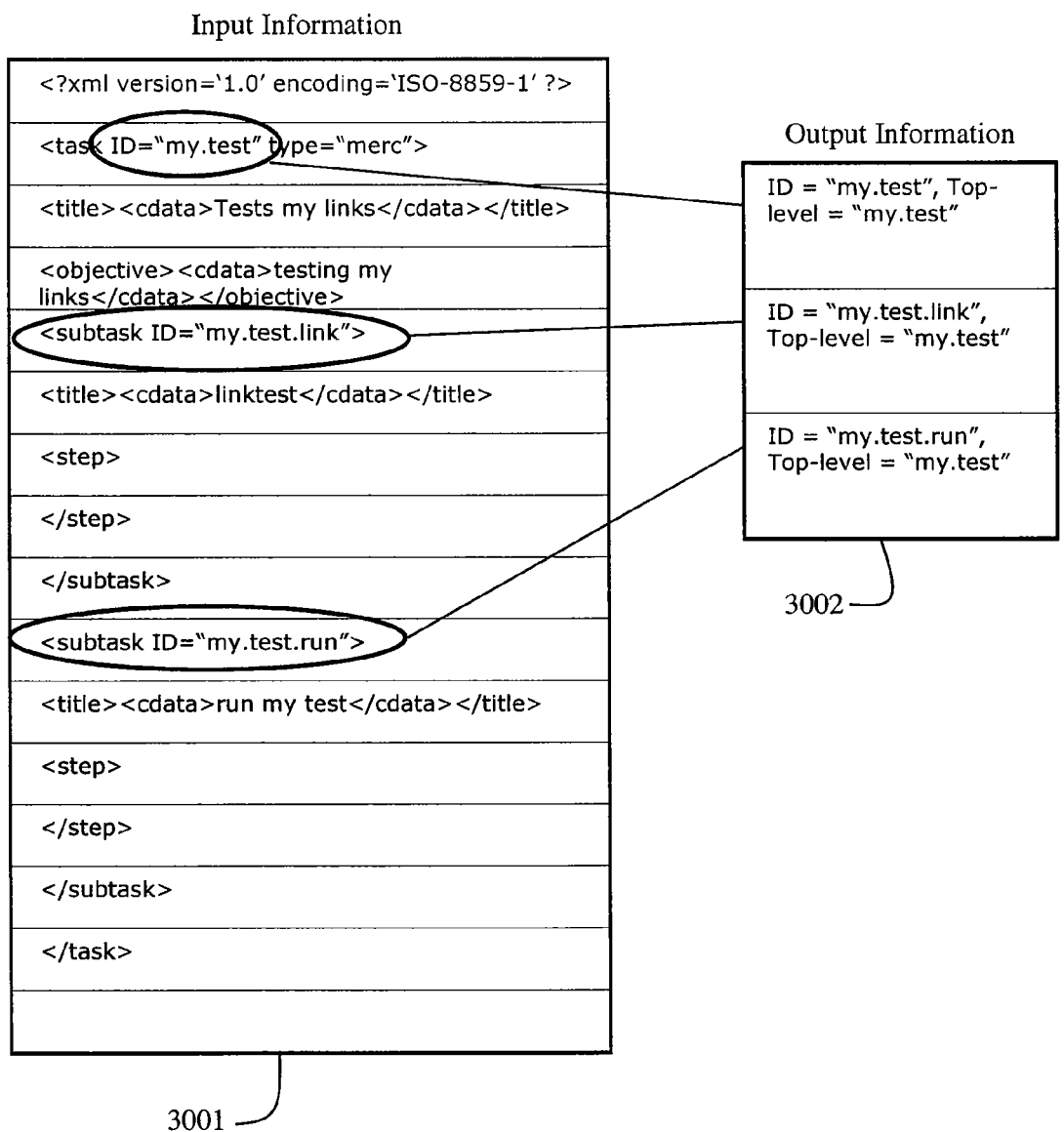
FIG. 13 is an illustration of the mapping of attributes contained in input information to identifiers or keys in a hash table index of output information according to various embodiments.

With respect to FIG. 13, there is shown an illustrative mapping of attributes contained in the input information 3001 to identifiers or keys in the hash table index of the output information 3002 for the example input and output information of Tables 4 and 5 in accordance with the database insertion process 3000. As shown in FIG. 13, the "ID" attribute is specified by the style sheet 1065 for generating database identifiers, or keys. Thus, the translator portion 1060 generates multiple levels of identifiers for occurrences of the "ID" attribute in the input information 3001. In particular, the "ID" attribute for "my.test" is assigned as the top-level identifier, and the "ID" attributes for "my.test.link" and "my.test.run" are determined to be sub-level identifiers. As shown in FIG. 13, the sub-level identifiers for "my.test.link" and "my.test.run" are associated with the top-level identifier "my.test." Therefore, the sub-level identifiers for "my.test.link" and "my.test.run" are hierarchically related to the top-level identifier "my.test." The top-level identifier "my.test" serves to identify the entire input information 3001 file, while the sub-level identifiers serve to identify XML in the input information 3001 associated with the sub-level identifier. The hierarchically-related top-level identifiers and sub-level identifiers shown in the output information 3002 of FIG. 13 can comprise a hash table index 1013 useful for retrieving all or a portion of the input information 3001 from the database 1007. Thus, the input information 3001 can be inserted into the database 1007 by the database interface portion 1070 in accordance with the insertion instruction page 3003 as described with respect to FIG. 12, for example, as a compressed file.

Figure 14:
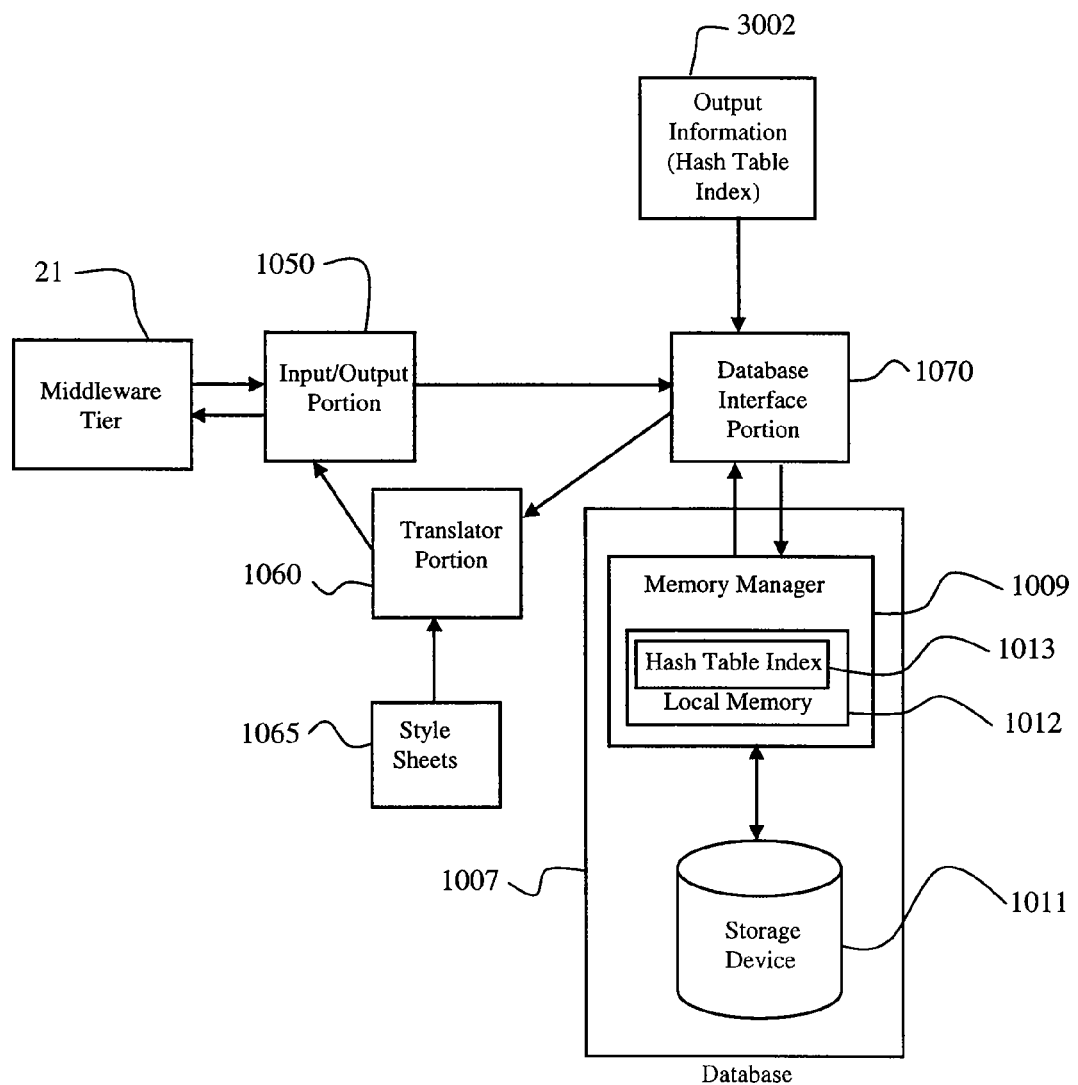
FIG. 14 is a database retrieval functional flow diagram according to various embodiments.

After insertion into the database 1007, the inserted document text, for example, markup language information of the input information 3001, can be retrieved from the database 1007 using the hash table index (for example, output data 3002). With respect to FIG. 14, there is shown a database retrieval flow diagram in accordance with various embodiments. As shown in FIG. 14, upon receiving a database read request from the Middleware Tier 21, the input/output portion 1050 can forward the database read request to the database interface portion 1070. In various embodiments, the Middleware Tier 21 can submit a database read request comprising a specific identifier to be obtained from the database 1007. For example, the database read request can comprise the identifier, "ID='my.test.link.'" It will be recalled from the previous example, "ID='my.test.link'" is a sub-level identifier that is hierarchically related to the top-level identifier ID="my.test." An example hash table index is shown in Table 6 below.

TABLE 6

Hash Table Index

| Key 1 | ID = "my.test", Top-level = "my.test" |
| Key 2 | ID = "my.test.link", Top-level = "my.test" |
| Key 3 | ID = "my.test.run", Top-level = "my.test" |
| Key 4 | ID = "hello.world", Top-level = "hello.world" |
| Key 5 | ID = "justin.time", Top-level = "justin.time" |
| Key 6 | ID = "outof.time", Top-level = "justin.time" |

Although six keys are shown in Table 6, it is to be understood that any number of keys can be included in the hash table index. The input/output portion 1060 can forward the database read request to the database interface portion 1070. Upon receiving the database read request, the database interface portion 1070 can search the keys in the hash table index 1013, via table look-up or other method, for the identifier contained in the database read request. For example, the database interface portion 1070 can perform a table lookup of the keys in the hash table index 1013 to determine that the second key in Table 6 corresponds to the specific identifier ("my.test.link") contained in the example database read request. The database interface portion 1070 can then form a database request using the sub-level identifier and top-level identifier located in the hash table index 1013. The database interface portion 1070 can then send the database request to the database 1007.

In various embodiments, upon receiving the database request, the memory manager 1009 of the database 1007 can determine if the information corresponding to the identifier is contained in local memory 1012 at the memory manager 1009. If so, then the memory manager 1009 can return the information (for example, XML) associated with the identifier in the database request to the database interface portion 1070, without reading the information from the storage device 1011. Because the local memory 1012 has a faster access time latency than the storage device 1011, storing information locally using the memory manager 1009 reduces the access time to the Middleware Tier 21 to obtain the requested information.

If the requested information is not contained in memory manager 1009 local memory 1012, then the memory manager 1009 performs a database read operation to obtain the requested information from the storage device 1011. The memory manager 1009 also can add the information read from the storage device 1011 to a hash table contained in local memory 1012, for faster access to the information in response to subsequent requests for it. In various embodiments, the information obtained from the database can comprise the entire file or entire amount of information associated with the top-level identifier. For example, for the located key "ID='my.test.link', Top-level='my.test'" will result in the database 1007 returning the entire file (for example, XML document) associated with the "my.test" top-level identifier.

In various embodiments, upon receiving the information from the database 1007, the database interface portion 1070 can forward the received information to the translator portion 1060. The translator portion 1060 can apply a third style sheet 1065 parses the information received from the database to strip out unwanted information prior to presenting or outputting the information to the client device 1002. For example, for the database access request comprising the sub-level identifier "my.test.link," the translator portion 1060 can remove all but the following information as shown in Table 7:

TABLE 7

Transformed Database Output Information

<subtask ID="my.test.link">
<title><cdata>linktest</cdata></title>
<step>
</step>
</subtask>

In this case, for information flowing from the database to the client device, the information obtained from the database 1007 can comprise information input to the translator portion 1060, and the transformed information provided to the Middleware Tier 21 can comprise information output by the translator portion 1060. The transformed database output information can then be forwarded to the input/output portion 1050 and transferred to the Middleware Tier 21 for further processing such as, for example, display to a user.

Therefore, unlike other databases available for maintaining markup language information, various embodiments comprising a system and method for inserting document text into a database and for retrieving portions of the document text from that database as described herein can provide, among other things, improved speed and efficiency in indexing and searching of information as well as improved speed of information retrieval from a database, because only the desired data is transferred to the requesting device. Further, various embodiments can be implemented using a relatively small number of instructions compared to other systems. While other databases use XPATH mechanisms to extract markup language from a database, various embodiments use unique keys created from attribute names to identify and obtain information from a database. In addition, various embodiments comprising the customized style sheets allow the user the capability to customize how information is parsed into the database and also how information is displayed to the user.

With respect to FIGS. 18A and 18B, there is shown an example third style sheet 1065 used to obtain the requested XML according to various embodiments. In the example shown in FIGS. 18A and 18B, the style sheet 1065 can cause the translator portion 1060 to be configured to obtain the top level XML associated with a top-level identifier or subtask level XML associated with a child identifier. In various embodiments, the third style sheet 1065 can be a .xsl file.

With respect to FIGS. 19A and 19B, there is shown another example third style sheet 1065 according to various embodiments. In the example shown in FIGS. 19A and 19B, the style sheet 1065 can cause the translator portion 1060 to be configured to obtain the XML associated with a particular language based on a chosen locale. For example, if information is stored in the database 1007 in three different languages (such as, for example, English, French and German), the style sheet 1065 can cause the translator portion 1060 to obtain only the French version, if the user requested the French version and the French version is available. The XML for other locales is removed from the information provided to the Middleware Tier 21.

With respect to FIGS. 20A and 20B, there is shown yet another example third style sheet 1065 according to various embodiments. In the example shown in FIGS. 20A and 20B, the style sheet 1065 can cause the translator portion 1060 to be configured to obtain the XML associated with a particular item of equipment or version of equipment. For example, if information is stored in the database 1007 for different versions of a document, the style sheet 1065 can cause the translator portion 1060 to obtain the latest version.

In various embodiments, the style sheets 1065 of FIGS. 19A and 19B, and 20A and 20B, can be applied after the style sheet 1065 of FIGS. 18A and 18B obtains the appropriate XML. In various embodiments, for processing of any style sheet 1065, elements encountered during translation that do not contain the requested attributes, or that do not match, can be returned to the Middleware Tier 21.

Figure 15A:
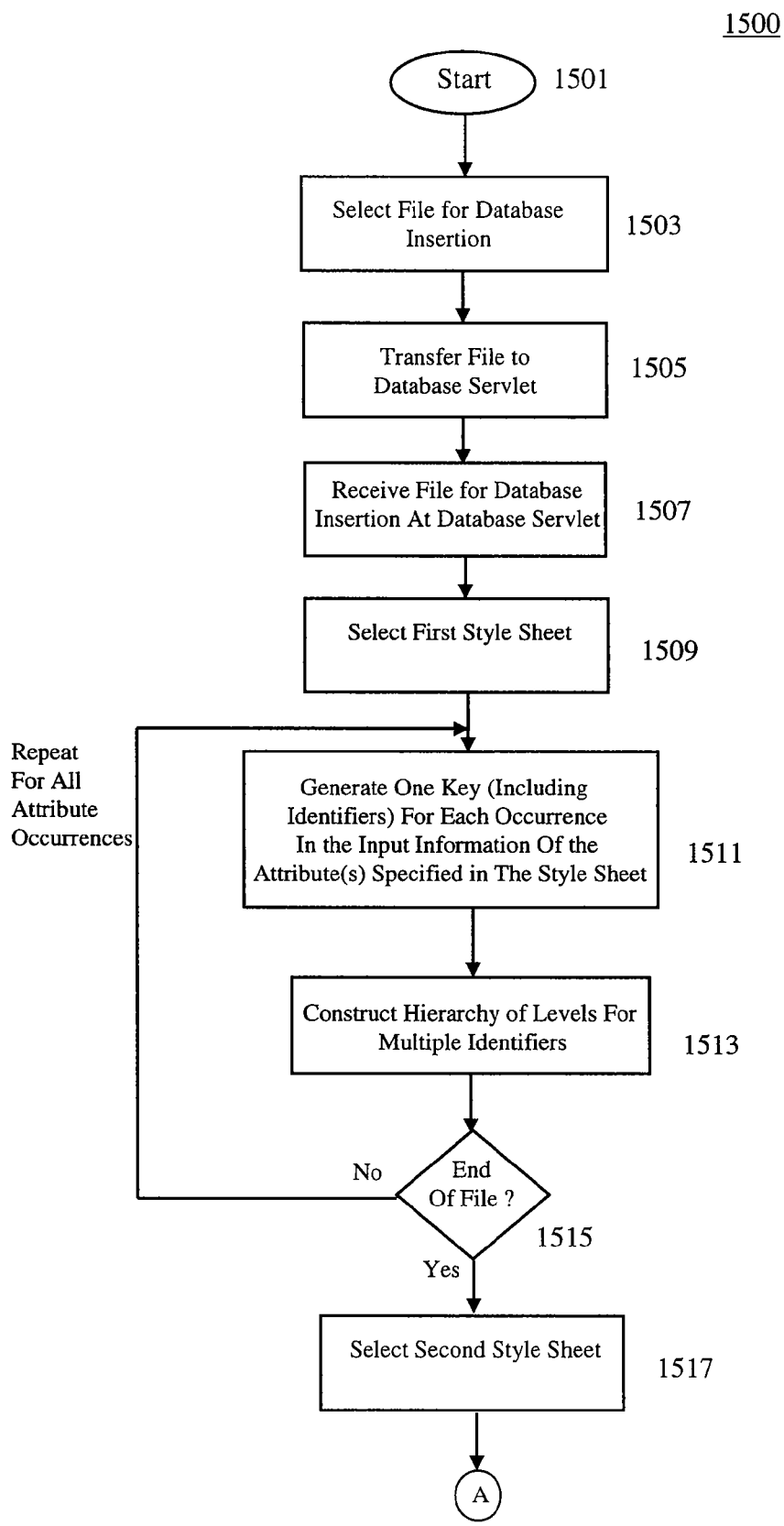
FIGS. 15A and 15B are a flow chart of a database insertion method according to various embodiments.
Figure 15B:
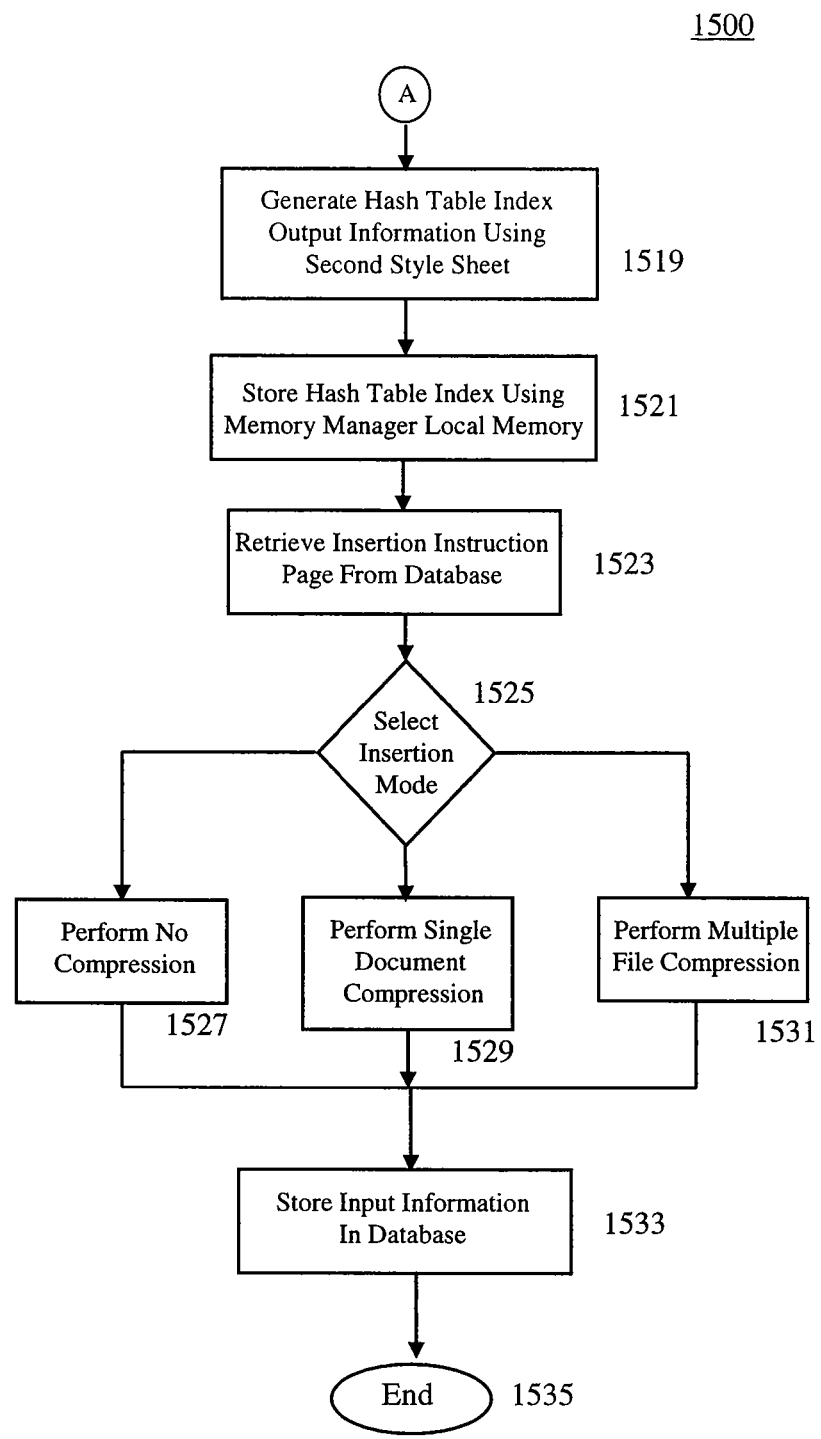

With respect to FIGS. 15A and 15B, there is shown a database insertion method 1500 according to various embodiments. As shown in FIG. 15A, the database insertion method 1500 can commence at 1501. The method can proceed to 1503, at which the user (for example, Diagnostic Engineer 10) selects a file for database insertion. The selection can be accomplished, for example, by entering a file identifier such as, for example, a file name, into a data entry field of an interactive page at the a remote computer of the Client Tier 12. The interactive page can comprise an HTML page, for example. The user can cause the Client Tier 12 to send the file to the database servlet (for example, the information storage and retrieval application 1005) at the Server Tier 31 (via the Middleware Tier 21) by actuating a button provided on the interactive page. Upon user actuation of the upload command or button, the Client Tier 12 can transfer the file to the database servlet, at 1505.

Control can then proceed to 1507, at which the file for database insertion can be received by the input/output portion 1050 of the database servlet. Upon recognizing a file for database insertion, the input/output portion 1050 can forward the file to the translator portion 1060. Control can then proceed to 1509, at which, upon receiving the input information (for example, the file for database insertion), the translator portion 1060 can select the first style sheet 1065. In various embodiments, the first style sheet 1065 can be retrieved from a memory of the Server Tier 31 or using the interface 103. Control can then proceed to 1511, at which the translator portion 1060 can apply the first style sheet 1065 to the received input information to generate a key for each occurrence of one of the attributes to in the input information specified in the first style sheet 1065. In various embodiments, the key can comprise one or more identifiers. Control can then proceed to 1513, at which the translator portion can construct a hierarchy of related identifiers as the keys are generated. In various embodiments, the keys can comprise, for example, a first sub-level identifier and another identifier that is the immediately preceding level identifier to which the first sub-level identifier belongs. Control can proceed to 1515, at which the translator portion 1060 can determine if the end of the input information has been reached (for example, end of file). If not, then control can return to 1511 to search for the next attribute in the input information selected by the first style sheet 1065, until keys have been generated for all matching attributes found in the input information.

Control can then proceed to 1517, at which the translator portion 1060 can select the second style sheet 1065. In various embodiments, the second style sheet 1065 can be retrieved from a memory of the Server Tier 31 or using the interface 103. Referring to FIG. 15B, control can then proceed to 1519, at which the translator portion 1060 can generate the output information 3002 using the identifiers and keys determined at 1511 and 1513 in accordance with the second style sheet 1065. In various embodiments, the output information 3002 can comprise a hash table index 1013. Control can then proceed to 1521, at which the translator portion 160 can store the hash table index 1013 in memory manager 1009 local memory 1012.

Control can then proceed to 1523, at which the database interface portion 1070 can retrieve the insertion instruction page 3003 from the database 1007. The insertion instruction page 3003 can comprise a markup language file such as, for example, a HyperText Markup Language (HTML) page. Control can then proceed to 1525, at which the database interface portion 1070 can apply the insertion instruction page 3003 to select the insertion mode for adding the input information 3001 into the database 1007. Control can proceed to 1527, 1529, or 1531 for insertion of the input information 3001 into the database 1007 in accordance with the insertion instruction page 3003. For example, at 1527, the database interface portion 1070 can format the input information 3001 for insertion into the database 1007 without using any compression. Alternatively, at 1529, the database interface portion 1070 can format the input information 3001 for insertion into the database 1007 by performing data compression of the input information 3001 as a single document. In various embodiments, the input information 3001 can be compressed using a compression algorithm such as, for example, the java.util.zip compression utility. Alternatively, at 1531, the database interface portion 1070 can format the input information 3001 for insertion into the database 1007 by performing data compression of the input information 3001 as multiple distinct files. For example, if the input information 3001 is received as a single ZIP file, then the database interface portion 1070 can unzip the ZIP file and insert individually each compressed file that is included in the ZIP file. In various embodiments, the database insertion portion 1070 can be configured to insert the input information 3001 into the database 1007 using the METHOD="POST" HTML instruction.

Control can then proceed to 1533, at which the database interface portion 1070 can store in, or upload to, the database 1007, the input information 3001 from 1529 or the compressed input information 3001 from 1531 or 1533 as either a single document or file, or as several compressed documents or files.

Figure 16A:
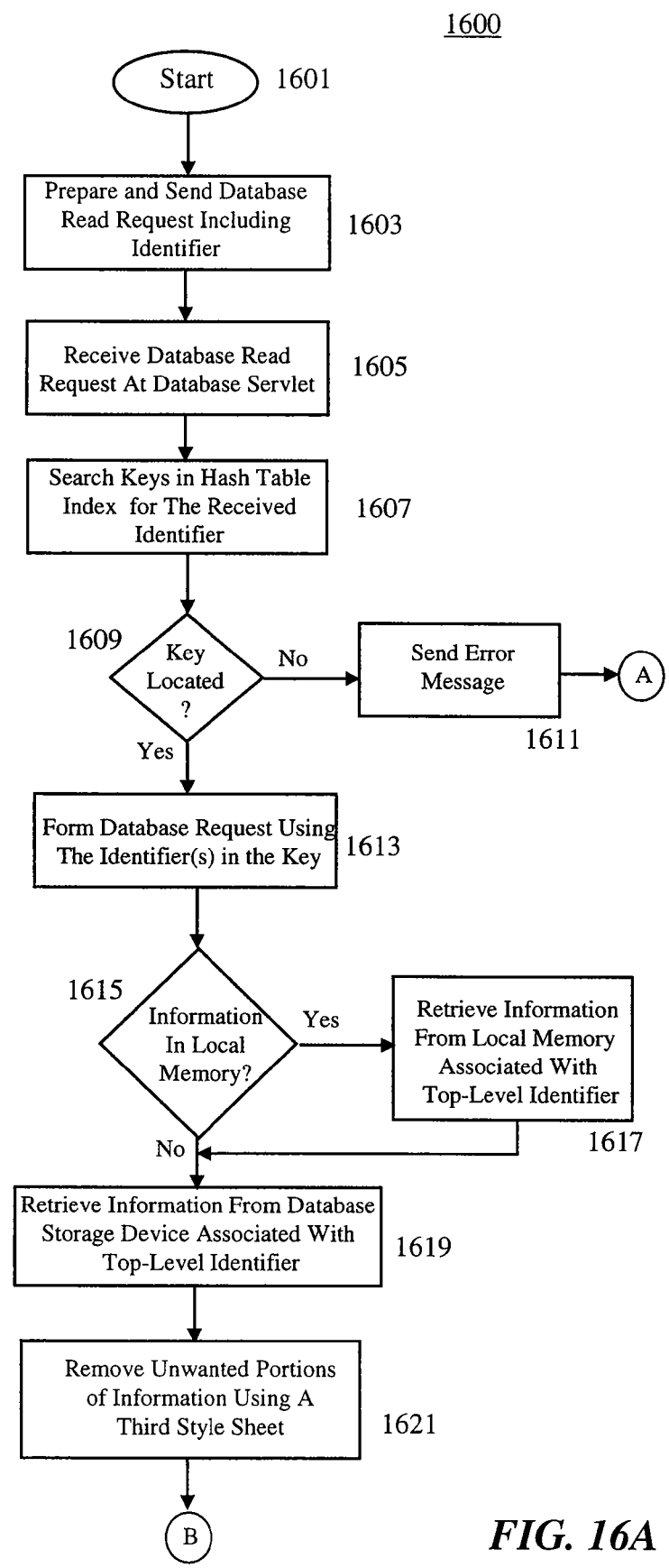
FIGS. 16A and 16B are a flow chart of a database retrieval method according to various embodiments.
Figure 16B:
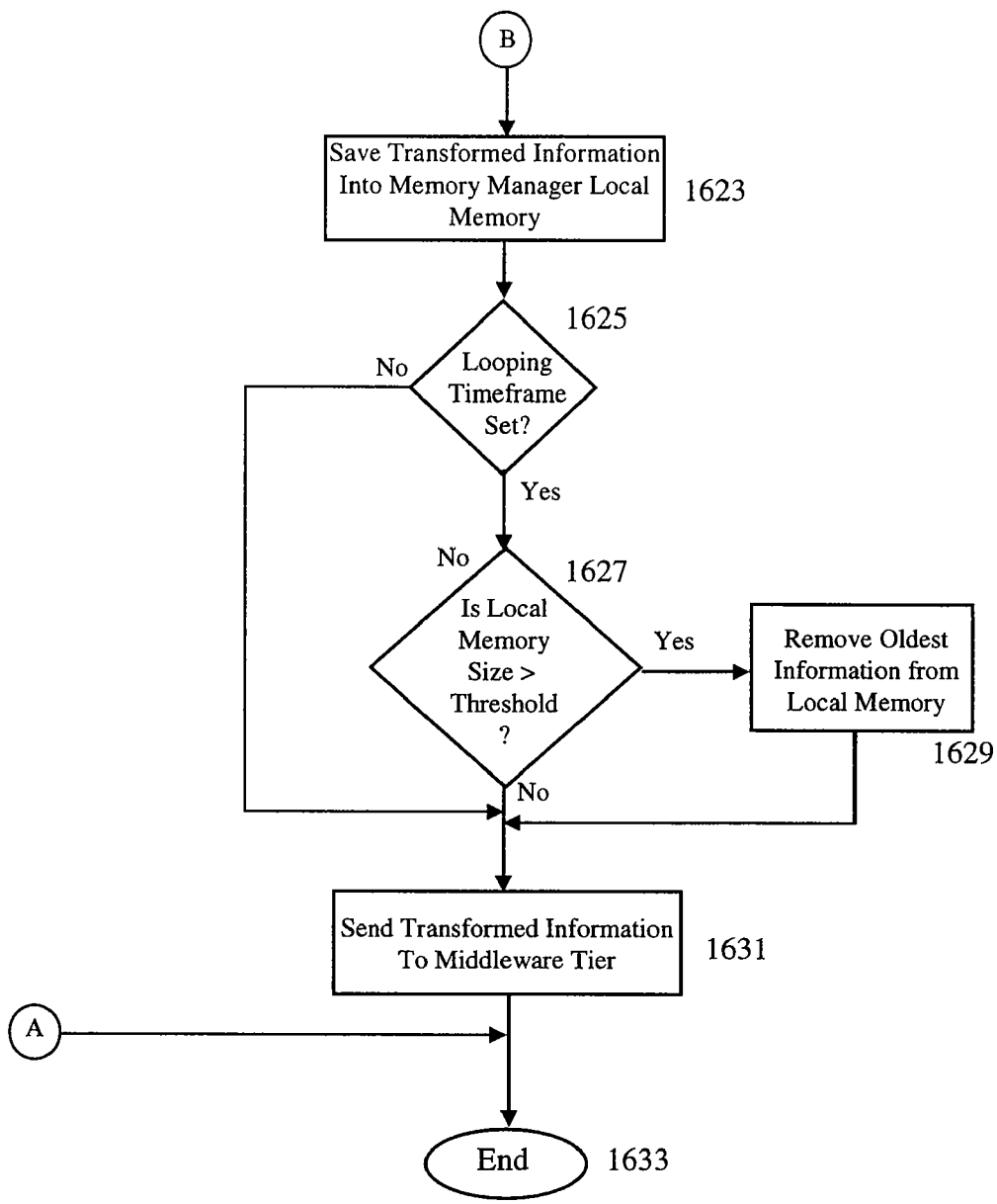

With respect to FIGS. 16A and 16B, there is shown a database retrieval method 1600 according to various embodiments. As shown in FIG. 16A, the database retrieval method 1600 can commence at 1601. The method can proceed to 1603, at which the Middleware Tier 21 prepares and sends a database read request to the Server Tier 31. In various embodiments, the Middleware Tier 21 can prepare and send the database read request in response to receiving a request for information from, for example, an application or in response to a user request received via user interface. In various embodiments, the Middleware Tier 21 can submit the database read request comprising a specific identifier to be obtained from the database 1007. For example, the database read request can comprise the sub-level identifier, "ID='my.test.link,' or other specific identifier to be obtained from the database 1007.

The method can then proceed to 1605, at which, at which the information storage & retrieval application (for example, database servlet) can receive the database read request from the Middleware Tier 21. In particular, upon receiving a database read request from the Middleware Tier 21, the input/output portion 1050 can forward the database read request to the database interface portion 1070. For example, the database read request can comprise the sub-level identifier, "ID='my.test.link.' The input/output portion 1060 can forward the database read request to the database interface portion 1070.

Control can then proceed to 1607, at which, upon receiving the database read request, the database interface portion 1070 can search the keys in the hash table index 1013, via table look-up or other method, for the identifier contained in the database read request. For example, the database interface portion 1070 can perform a table lookup of the keys in the hash table index 1013 to determine the key that corresponds to the specific identifier contained in the database read request. Control can then proceed to 1609, at which the database interface portion 1070 can determine if the hash table index 1013 contains keys matching the specific identifier contained in the database read request. If not, control can proceed to 1611, at which the database interface portion 1070 can send (via the input/output portion 1050) an error message to the Middleware Tier 21 indicating no matching entry in the database 1007. In various embodiments, the error message can comprise an HTTP response indicating request failure.

If a key is located within the hash table index, then control can then proceed to 1613, at which the database interface portion 1070 can form a database request using the sub-level identifier, if received, and top-level identifier located in the hash table index 1013, and then send the database request to the database 1007.

Control can then proceed to 1615, at which, upon receiving the database request, the memory manager 1009 of the database 1007 can determine if the information corresponding to the identifier is contained in local memory 1012 at the memory manager 1009. If so, then control can proceed to 1617, at which the memory manager 1009 can return the information (for example, XML) associated with the identifier in the database request to the database interface portion 1070, without reading the information from the storage device 1011. Because the local memory 1012 has a faster access time latency than the storage device 1011, storing information locally using the memory manager 1009 reduces the access time to the Middleware Tier 21 and also to the user (for example, Diagnostic Engineer 10) to obtain the requested information.

If the requested information is not contained in memory manager 1009 local memory 1012, then control can proceed to 1619, at which the memory manager 1009 performs a database read operation to obtain the requested information from the storage device 1011. In various embodiments, the information obtained from the database storage device 1011 can comprise the entire file or entire amount of information associated with the top-level identifier. For example, for the located key "ID='my.test.link', Top-level='my.test'" will result in the database 1007 returning the entire file (for example, XML document) associated with the "my.test" top-level identifier.

Control can then proceed to 1621, at which, upon receiving the information from the database 1007, the database interface portion 1070 can forward the received information to the translator portion 1060 and the translator portion 1060 can apply a third style sheet 1065 parses the information received from the database to strip out unwanted information prior to presenting or outputting the information to the Middleware Tier 21, such that the transformed information returned to the Middleware Tier 21 is only the information associated with the selected sub-level identifier, and not the remaining information in the document stored in the database. Therefore, only the information needed by the user is actually transferred to the user, resulting in more efficient and timely responses to database requests. In various embodiments, the translator portion 1060 can be configured to perform an XSL translation that results in only pertinent data being obtained. For example, the translator portion 1060 can be configured to extract information by identifier and by attributes passed to the database 1007. Values that do not agree with the attributes can be removed. Elements that do not contain the attributes or match can be passed back to the client.

Referring to FIG. 16B, control can then proceed to 1623, at which the memory manager 1009 also can add the transformed information to the hash table in local memory 1012, for faster access to the information in response to subsequent requests for it. Upon adding the transformed information to the hash table, control can then proceed to 1625, at which the memory manager 1009 can determine whether or not looping timeframe is met. For example, the memory manager 1009 can maintain a counter that is incremented each time information is added to the hash table. Upon the counter reaching a predetermined number, for example, a parameter specifying the number of iterations or "loops" to occur before setting the looping timeframe to an active state, then control can proceed to 1627, at which the memory manager 1009 can determine if the local memory 1012 size has exceeded a target threshold size. If the looping timeframe is not set (for example, the number of iterations has not yet been reached), then control can proceed to 1631.

If at 1627 the memory determines that the local memory 1012 size has exceeded the target threshold size, then control can proceed to 1629, at which the memory manager 1009 can remove the oldest information in local memory 1012 to provide capacity to store the transformed information and maintain the size of the local memory 1012 below the target threshold size. In various embodiments, the target threshold is configurable and can be modified by, for example, updating an input parameter specifying the target size threshold contained in a configuration file.

Control can then proceed to 1631, at which the input/output portion 1050 can send the transformed database information to the Middleware Tier 21 for further processing such as, for example, display to a user. In various embodiments, the transformed information obtained from the database can be output to the user as an HTTP response. Control can then proceed to 1633, at which the method can end.

SUT Communication

The present invention allows the IETM application to be extracted from the communication mechanism. In a preferred embodiment, Java class loader technology is used to start or load the communication mechanism called out in the configuration information. New communication technologies can be added without modifying the existing IETM application. In integrating a new communication mechanism, a new communication class is created by overriding the functionality of a pre-defined interface, included into a library extension, and referenced in the configuration information.

Figure 8:
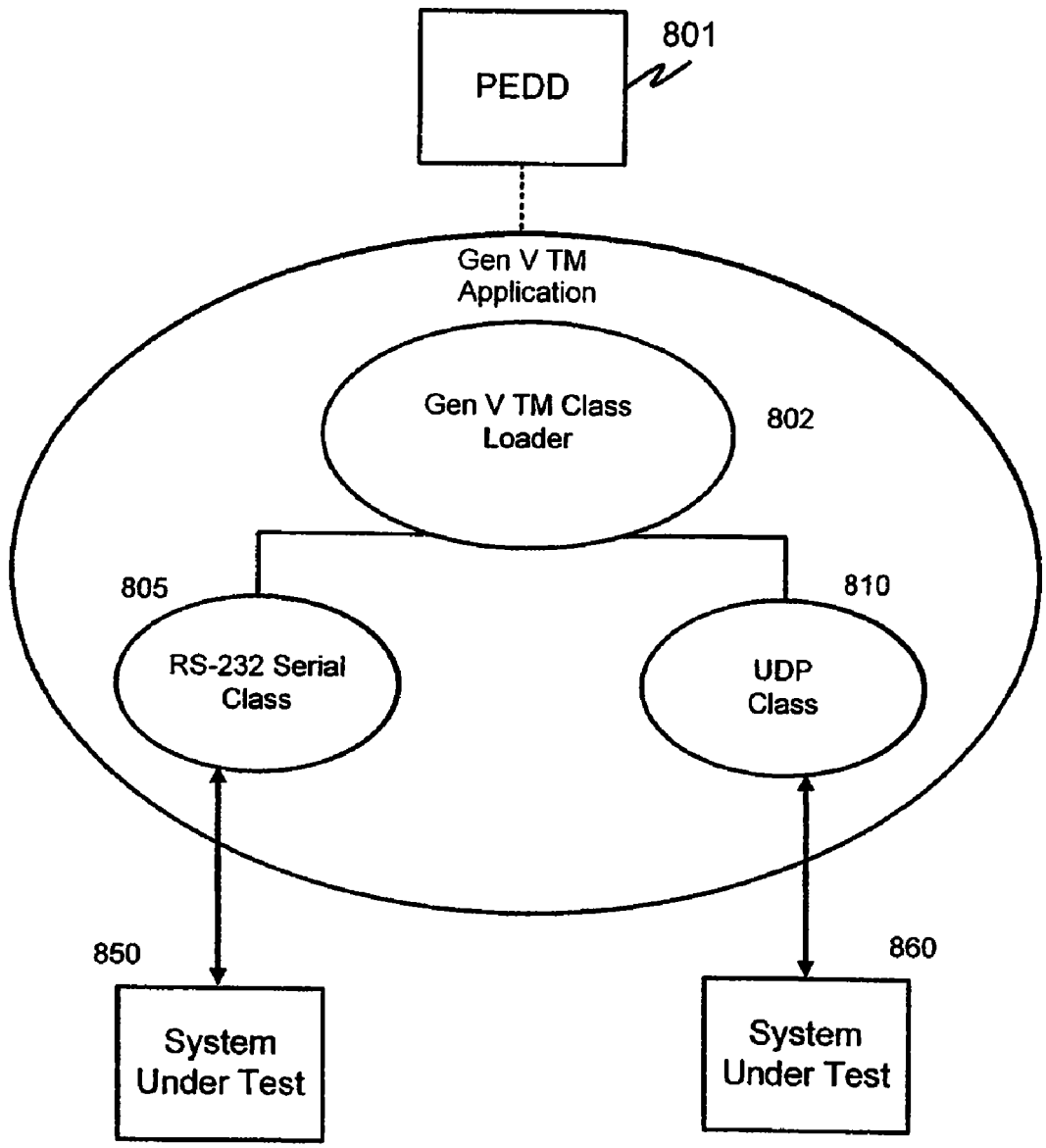
FIG. 8 illustrates the Communication Build process used to allow for multiple SUT communication modes.

FIG. 8 illustrates how an IETM application can be loaded to use either RS-232 Serial Class communications or UDP class communications. As shown, JAVA class loader 802 can either load RS-232 Serial communication class 805 or UDP communication class 810, according to configuration data. This dynamic loading of classes upon the initiation of the IETM program allows for the easy addition of additional communication classes. The IETM supports multiple types of configuration files. For example, one type of configuration file is a user "look and feel" type, which is typically store locally on a PEDD data storage device, the second type of configuration file may be database resident and may contain pertinent information for performing communications to an SUT/UUT, as well as other external applications, such as, for example, Simulators, Support Applications (for example Internet Explorer™, Adobe™ Acrobat™ Reader and Microsoft™ Word™) and/or the like.

Each product supported by an exemplary embodiment of a task processor in accordance with the present invention, such as, for example, a Generation V™ Task Processor has one or more associated "product configuration" files, which allow IT personnel to adapt the Generation V™ Task Processor to specific needs (requirements) of a customer. The adaptations for specific customer needs include the capability to specify the following:

the number, title and content of each "Table of Contents";
the number, description, deterministic characteristics of unique task types. Also included here is the specific style sheet to be used during printing;
the number, description and programmatic steps for hyper linking within the application, allowing the easy customization to the customer's environment;
an initialization task;
a data connection customization task;
a quantity, description and location of log files;
a reference to a user-specific configuration task XML id;
a system interface;
a number, id and class name which implements the network protocols to be used in processing;
a number, id and class name which implements the information protocols to be used in processing;
a default IP address and port for initialization processing;
an SUT connection customization task to initialize PEDD-SUT interface variables;
Interface Control Message Headers;
a name of the ICM;
a request header id;

a response header id;

an Interface Control Message Header Validation Test XML id;

an Interface Control Message Header Validation Failed XML id;

PEDD-SUT Connection Indicator details;

a request header id and processing details; and a response header id and processing details.

As shown in the above figures, an interactive electronic technical manual system integrated with the system under test in accordance with the present invention can be implemented on a general-purpose computer, a special-purpose computer, a programmed microprocessor or microcontroller and peripheral integrated circuit element, and ASIC or other integrated circuit, a digital signal processor, a hardwired electronic or logic circuit such as a discrete element circuit, a programmed logic device such as a PLD, PLA, FPGA, PAL, or the like. In general, any process capable of implementing the functions described herein can be used to implement an interactive electronic technical manual system integrated with the system under test according to this invention.

Furthermore, the disclosed system may be readily implemented in software using object or object-oriented software development environments that provide portable source code that can be used on a variety of computer platforms. Alternatively, the disclosed interactive electronic technical manual system integrated with the system under test may be implemented partially or fully in hardware using standard logic circuits or a VLSI design. Other hardware or software can be used to implement the systems in accordance with this invention depending on the speed and/or efficiency requirements of the systems, the particular function, and/or a particular software or hardware system, microprocessor, or microcomputer system being utilized. The interactive electronic technical manual system integrated with the system under test illustrated herein can readily be implemented in hardware and/or software using any known or later developed systems or structures, devices and/or software by those of ordinary skill in the applicable art from the functional description provided herein and with a general basic knowledge of the computer and mark-up language arts.

Moreover, the disclosed methods may be readily implemented in software executed on programmed general-purpose computer, a special purpose computer, a microprocessor, or the like. In these instances, the systems and methods of this invention can be implemented as program embedded on personal computer such as Java® or CGI script, as a resource residing on a server or graphics workstation, as a routine embedded in a dedicated encoding/decoding system, or the like. The system can also be implemented by physically incorporating the system and method into a software and/or hardware system, such as the hardware and software systems of an image processor.

Thus has been disclosed a system and method for inserting document text into a database and for retrieving portions of the document text from that database. The system and method can provide, among other things, improved speed and efficiency in indexing and searching of information as well as improved speed of information retrieval from a database, because only the desired data is transferred to the requesting device.

It is, therefore, apparent that there is provided in accordance with the present invention, an interactive electronic technical manual system integrated with the system under test. While this invention has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of this invention.

We claim:

1. A method for dynamically displaying information about a system under test using an interactive electronic technical manual system, wherein said system under test is associated with at least one system key, comprising the steps of:

receiving mark-up language data at the interactive electronic technical manual system, wherein a portion of said mark-up language data includes at least one translation key and a plurality of identifiers, said at least one translation key corresponding to a system key associated with the system under test;

filtering the mark-up language data using a first style sheet to provide filtered mark-up language data;

displaying the filtered mark-up language data by the interactive electronic technical manual system;

associating a tag with one of a plurality of identifiers;

generating a hash table comprising a plurality of levels, wherein each one of said plurality of levels is hierarchically related to another one of said plurality of levels, and wherein each one of said plurality of levels is associated with one of said plurality of identifiers;

determining each occurrence of one of the plurality of identifiers within the mark-up language data by searching the mark-up language data for a text stream that matches the identifier using a second style sheet; and generating a hash table index comprising at least one index key, wherein the at least one index key comprises at least one of the plurality of identifiers;

wherein the first style sheet filters the mark-up language data by comparing a value of each translation key with a value of the system key that corresponds to the translation key, and removing any mark-up language data whose translation key value does not match the value of the corresponding system key.

2. The method of claim 1, wherein the mark-up language is extensible markup language (XML).

3. The method of claim 2, further comprising:

selecting the at least one identifier; and modifying the second style sheet to use the at least one selected identifier.

4. The method of claim 1, further comprising:

performing data compression on the mark-up language data to form a compressed document; and inserting the compressed document text into the local memory and the hard disk of the database according to an insertion page comprising database insertion instructions provided in accordance with a second mark-up language.

5. The method of claim 4, further comprising:

determining whether or not the local memory size has exceeded a target threshold size; and removing, if the target threshold size has been exceeded, the oldest information from the local memory to maintain the local memory size below the target threshold size.

6. An interactive electronic technical manual system for diagnosing faults in a complex system, comprising:

a portable electronic display device;

a client tier component configured to cause the portable electronic display device, when executing said client tier component, to interface with the complex system according to a mark-up language encoded diagnostic fault flow;

a middleware tier component configured to cause the portable electronic display device, when executing the middleware tier component, to receive a request for execution of a diagnostic fault flow from a remote computer via a network interface and to cause the portable electronic display device to execute the requested diagnostic fault flow using the client tier component; and a network server computer which executes a server tier component and comprising a database, said database storing mark-up language encoded diagnostic fault flows;

an information storage and retrieval application coupled to the database and configured to receive mark-up language information and database requests from the portable electronic display device and further comprising a translator portion configured to cause the network server computer to generate a key based on each occurrence of a selected attribute occurring in a file, the selected attribute being specified using a first style sheet; and a memory manager.

7. The system of claim 6, wherein the memory manager further comprises:

a local memory including a hash table index and a hash table;

wherein the translator portion is configured to cause the network server computer to form the key using at least one identifier associated with the selected attribute and to add one or more keys to the hash table index in accordance with a second style sheet.

8. The system of claim 7, wherein the at least one identifier comprises a top-level identifier and at least one sub-level identifier, and wherein the at least one sub-level identifier and the top-level identifier are hierarchically related; and wherein the top-level identifier is associated with a document comprising input information, and wherein each of the at least one sub-level identifiers is identified with a portion of the input information.

9. The system of claim 7, wherein the translator portion is further configured to cause the network server computer to insert input information into the database in accordance with an insertion instruction page, and to transform information received from the database in accordance with a third style sheet.

10. The system of claim 6, wherein said request for execution of a diagnostic fault flow comprises a diagnostic fault flow identifier, and said middleware tier component is configured to cause the portable electronic display device to request a mark-up language encoded diagnostic fault flow from the network server computer database corresponding to the diagnostic fault flow identifier, and to cause the client portable electronic display device to execute the mark-up language encoded diagnostic fault flow that corresponds to the diagnostic fault flow identifier; and wherein the mark-up language encoded diagnostic fault flow corresponding to the diagnostic fault flow identifier is sent from the network server computer as an object access protocol message to the middleware tier component of the portable electronic display device.

11. The system of claim 6, wherein said request for execution of a diagnostic fault flow comprises a mark-up language encoded diagnostic fault flow process, and said portable electronic display device is configured by said middleware tier component to execute the mark-up language encoded diagnostic fault flow process in said request using the client tier component.

12. The system of claim 6, wherein said portable electronic display device is configured to interface with the complex electronic system by requesting execution of a built-in-test and receiving the results of the requested built-in-test.

13. The system of claim 6, wherein the server tier component is distributed on the network server computer and the client tier component is distributed on the portable electronic display device.

14. The system of claim 13, wherein the middleware tier component is logically distributed between the network server computer and the portable electronic display device.

15. The system of claim 6, wherein the server tier component, the middleware tier component and the client tier component are each distributed on the portable electronic display device.

16. The system of claim 6, wherein the server tier component is stored on both a network server computer and a portable electronic display device, and wherein the middleware tier component synchronizes the server tier component database on the portable electronic display device with the server tier component database on the network server by copying files from the network server to the portable electronic display device when the portable electronic display device is connected to the network server over a network.

17. The system of claim 6, wherein the complex system is a helicopter.

18. A method for dynamically displaying information about diagnosing faults in an aircraft under test using an interactive electronic technical manual system, wherein said system under test is associated with at least one system key, comprising the steps of:

receiving mark-up language data at the interactive electronic technical manual system, wherein a portion of said mark-up language data includes at least one translation key and a plurality of identifiers, said at least one translation key corresponding to a system key associated with the aircraft under test;

filtering the mark-up language data using a first style sheet to provide filtered mark-up language data;

displaying the filtered mark-up language data by the interactive electronic technical manual system;

associating a tag with one of the plurality of identifiers;

determining each occurrence of one of the plurality of identifiers within the mark-up language data by searching the mark-up language data for a text stream that matches the identifier using a second style sheet; and generating a hash table index comprising at least one index key, wherein the at least one index key comprises at least one of the plurality of identifiers;

wherein the first style sheet filters the mark-up language data by comparing a value of each translation key with a value of the system key that corresponds to the translation key.

19. The method of claim 18, further comprising:

removing any mark-up language data whose translation key value does not match the value of the corresponding system key; and wherein the hash table comprises a plurality of levels, wherein each one of said plurality of levels is hierarchically related to another one of said plurality of levels, and wherein each one of said plurality of levels is associated with one of said plurality of identifiers.

20. The method of claim 18, wherein the aircraft is a helicopter.

21. The method of claim 18, further comprising:

outputting the filtered mark-up language data to a handheld device.

* * * * *

UNITED STATES PATENT AND TRADEMARK OFFICE
CERTIFICATE OF CORRECTION

| | | |
|---|---|---|
| PATENT NO. | : 7,823,062 B2 | Page 1 of 1 |
| APPLICATION NO. | : 11/562336 | |
| DATED | : October 26, 2010 | |
| INVENTOR(S) | : Matthew R. Liberty et al. | |

It is certified that error appears in the above-identified patent and that said Letters Patent is hereby corrected as shown below:

On the title page, insert item (63), as follows:

-- Related U.S. Application Data
(63) This application is a continuation of Application No. 11/466,478, filed Aug. 23, 2006, and is related to Application No. 11/019,295, filed Dec. 23, 2004. --

Signed and Sealed this
Eighteenth Day of January, 2011

David J. Kappos
*Director of the United States Patent and Trademark Office*